(12) United States Patent
Kojima

(10) Patent No.: US 11,009,827 B2
(45) Date of Patent: May 18, 2021

(54) IMAGE FORMING APPARATUS HAVING GUIDE MEMBERS FOR PRINT HEAD

(71) Applicant: TOSHIBA TEC KABUSHIKI KAISHA, Tokyo (JP)

(72) Inventor: Takahiro Kojima, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/895,938

(22) Filed: Jun. 8, 2020

(65) Prior Publication Data

US 2021/0072695 A1    Mar. 11, 2021

(30) Foreign Application Priority Data

Sep. 5, 2019  (JP) .............................. JP2019-162371

(51) Int. Cl.
| | | |
|---|---|---|
| *G03G 21/00* | (2006.01) | |
| *G06K 15/00* | (2006.01) | |
| *G03G 21/16* | (2006.01) | |
| *G06K 15/12* | (2006.01) | |

(Continued)

(52) U.S. Cl.
CPC ... *G03G 21/1666* (2013.01); *G03G 15/04054* (2013.01); *G03G 21/1647* (2013.01); *G03G 21/1652* (2013.01); *G03G 21/1671* (2013.01); *G03G 21/1842* (2013.01); *G06K 15/1247* (2013.01); *G03G 2215/0409* (2013.01); *G03G 2221/1636* (2013.01); *G03G 2221/1884* (2013.01)

(58) Field of Classification Search
CPC ....... G03G 15/04054; G03G 15/04036; G03G 21/1842; G03G 21/185; G03G 21/1647; G03G 21/1666; G03G 21/1671; G03G 2215/0412; G03G 2215/0409; G03G 2221/1606; G03G 2221/1636; G03G 2221/1884; G06K 15/1247; G06K 15/1261
USPC .......................... 399/111, 118; 347/138, 152
See application file for complete search history.

(56) References Cited

U.S. PATENT DOCUMENTS

| | | | | |
|---|---|---|---|---|
| 8,038,240 B2 * | 10/2011 | Tsai | ....................... | B41J 25/308 347/8 |
| 8,068,764 B2 * | 11/2011 | Sakaguchi | ......... | G03G 21/1666 399/118 |
| 9,146,473 B2 * | 9/2015 | Mikami | ................ | G03F 7/2012 |

(Continued)

FOREIGN PATENT DOCUMENTS

| JP | 09319173 A | * | 12/1997 |
|---|---|---|---|
| JP | 2005014497 A | * | 1/2005 |

(Continued)

*Primary Examiner* — Robert B Beatty
(74) *Attorney, Agent, or Firm* — Kim & Stewart LLP

(57) ABSTRACT

An image forming apparatus includes a port to permit a imaging unit to be installed. A solid head unit has a base, a lifting mechanism, a print head, and a first guide. The lifting mechanism moves the print head up and down. The first guide includes a first guide rail facing the print head that limits the movement of the print head to a first range when the print head and a second, greater range when the print head is raised. The imaging unit includes a photoconductive drum in a drum case that includes a projection facing the solid head unit. The projection is configured to insert into a hole in the print head when the print head is raised.

20 Claims, 22 Drawing Sheets

(51) Int. Cl.
*G03G 21/18* (2006.01)
*G03G 15/04* (2006.01)

(56) References Cited

U.S. PATENT DOCUMENTS

| | | | |
|---|---|---|---|
| 10,401,754 B2 * | 9/2019 | Gokyu | G03G 21/1647 |
| 2013/0315625 A1 | 11/2013 | Fujita et al. | |
| 2017/0371292 A1 | 12/2017 | Narita et al. | |
| 2018/0275556 A1 | 9/2018 | Nagamine | |
| 2020/0301344 A1 * | 9/2020 | Kojima | G03G 15/751 |

FOREIGN PATENT DOCUMENTS

| | | | | |
|---|---|---|---|---|
| JP | 2007090675 A | * | 4/2007 | |
| JP | 2008209862 A | | 9/2008 | |
| JP | 2010076130 A | * | 4/2010 | |
| JP | 2011145551 A | * | 7/2011 | G03G 21/1633 |

\* cited by examiner

IMAGE FORMING APPARATUS HAVING GUIDE MEMBERS FOR PRINT HEAD

CROSS-REFERENCE TO RELATED APPLICATIONS

This application is based upon and claims the benefit of priority from Japanese Patent Application No. 2019-162371, filed on Sep. 5, 2019, the entire contents of which are incorporated herein by reference.

FIELD

The present disclosure relates to image forming apparatuses.

BACKGROUND

In an image forming apparatus, such as an electrophotographic printer, a technique is known in which a photosensitive drum of an image forming unit is exposed to light from an exposure apparatus having a solid state head, such as an LED print head. A developer such as toner is then attached to the photosensitive drum after the exposure, and then the developer is transferred from the drum to a sheet.

When head cleaning and/or an image forming unit exchange is performed, the head must be separated from the photosensitive drum. However, during image formation, the head must be brought into contact with the image forming unit to be located at a predetermined contact position with respect to the photosensitive drum. In addition, in order to set the relative positions of the head and the photosensitive drum at a predetermined spacing position or an abutting position, the head and image forming unit must be precisely positioned. For this reason, there is provided a mechanism capable of reciprocating the head between two positions, one position being an abutting position at which the image forming unit is in contact (engaged) with the image forming unit and a separated position at which the head unit is spaced (disengaged) from the image forming unit. When the head moves from the separated position to the abutting position for printing, a hole for positioning the head matches with a positioning projection of the image forming unit, and the head is thus configured to determine its position along the scanning direction and in the conveyance direction with respect to the image forming unit.

In such a structure, when the head is being moved, the case surrounding the head becomes a guide during the movement, and since generally the tip of the projection of the image forming unit is narrow and the periphery of the hole for positioning the head is chamfered, the hole shaping plays the role of a guide when the tip is being inserted.

However, if the positional relationship between the head and the image forming unit is shifted, the projection of the image forming unit cannot be inserted into the hole of the head, and there is a possibility that the positioning cannot be correctly performed.

DETAILED DESCRIPTION

Figure 1:
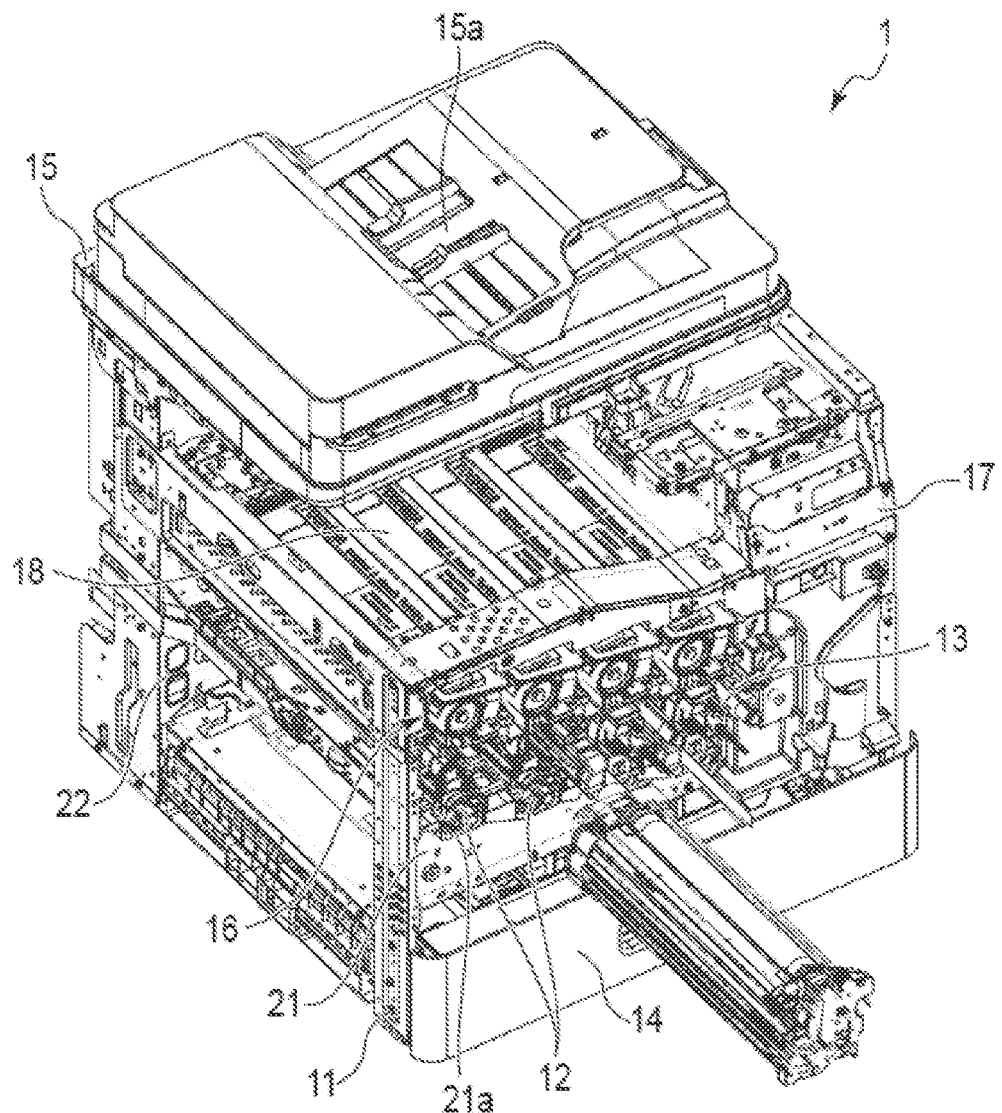
FIG. 1 is a perspective view of an image forming apparatus according to an embodiment.
Figure 1:
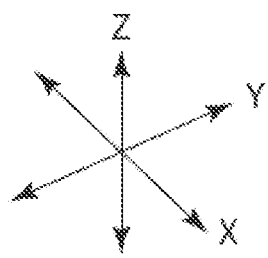

According to one embodiment, an image forming apparatus includes a first frame with an insertion port configured for insertion of an image forming unit along a first direction, a second frame spaced from the first frame in the first direction, a solid head unit, and an imaging unit. The solid head unit includes a base that is attached to the first and second frames, a lifting mechanism, a solid-state print head, and a first guide member. The lifting mechanism is supported by the base and configured to move the solid-state print head up and down with respect to the base in response to movement of an operating lever that is accessible at the insertion port. The first guide member is configured to position the solid head unit in a second direction perpendicular to the first direction and include a first guide rail on a surface facing the solid-state print head. The first guide rail limits the movement of the solid-state print head in the first direction to a first range when the solid-state print head is lowered towards the base and a second range when the solid-state print head is raised. The first range is less than the second range. The imaging unit includes a photoconductive drum in a drum case. The imaging unit can be inserted and removed via the insertion port. The drum case includes at least on projection portion positioned to face the solid head unit when the imaging unit has been inserted via the insertion port. The projection portion is configured to insert into a hole in the solid-state print head when the solid-state print head is raised from the base.

Hereinafter, an image forming apparatus 1 according to one embodiment of the present disclosure will be described with reference to the drawings. When referencing the drawings the direction along the Y axis will be considered the front-to-back direction, the direction along the X axis will be side-to-side direction corresponding generally to the sheet width direction, and the Z axis direction is the top-to-bottom direction. When referencing printing process, a direction corresponding to the sheet width direction may be referred to as the scanning direction and a direction corresponding to the sheet length direction may be referred to as the sub-scanning direction. The X direction also corresponds in general to the axial direction of a photosensitive drum 52 when the image forming unit 13 is inserted in the frame 11 and attached to a solid state head unit 12 (also referred to as a solid head unit 12 for simplicity).

Figure 2:
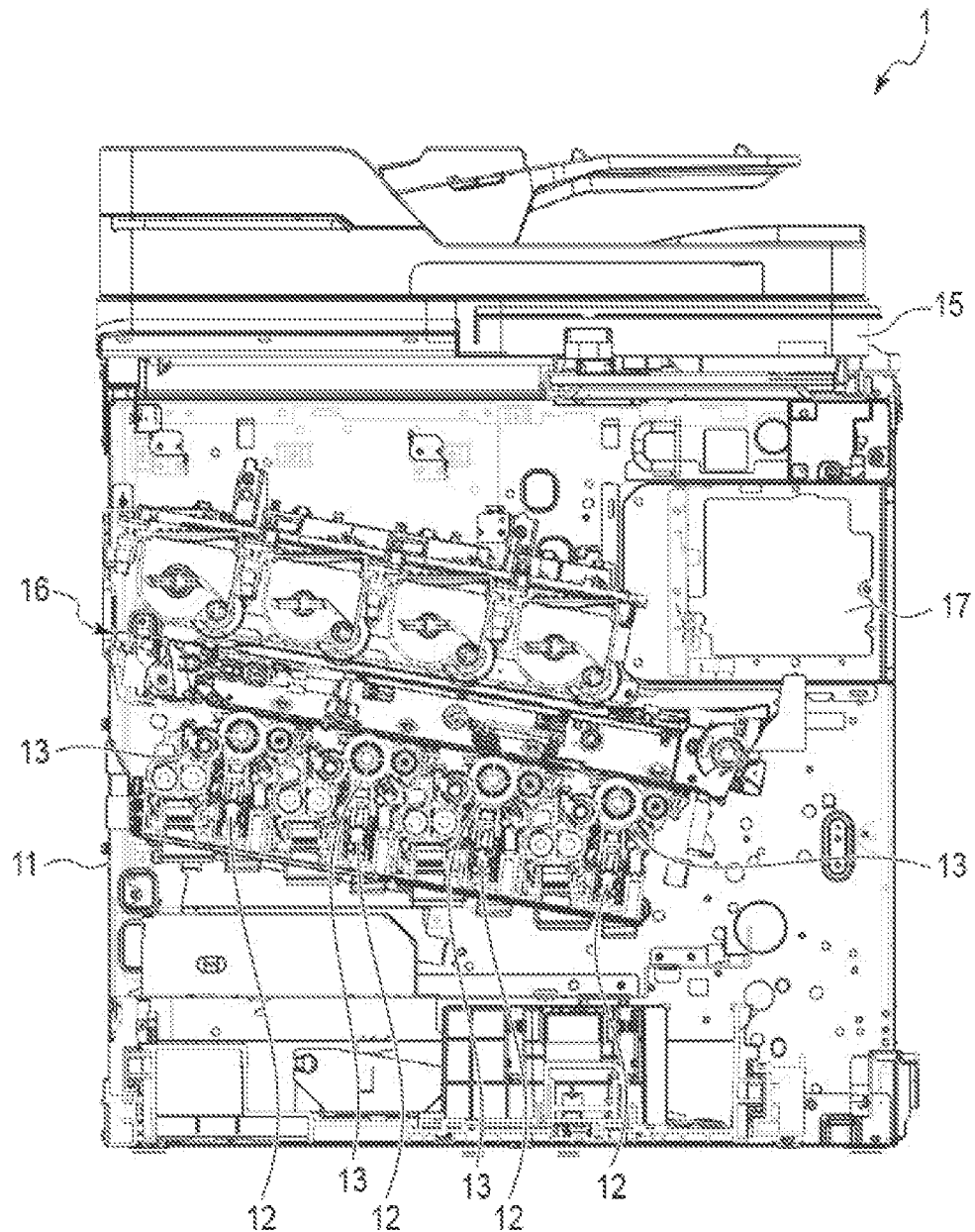
FIG. 2 is a front view of an image forming apparatus.
Figure 3:
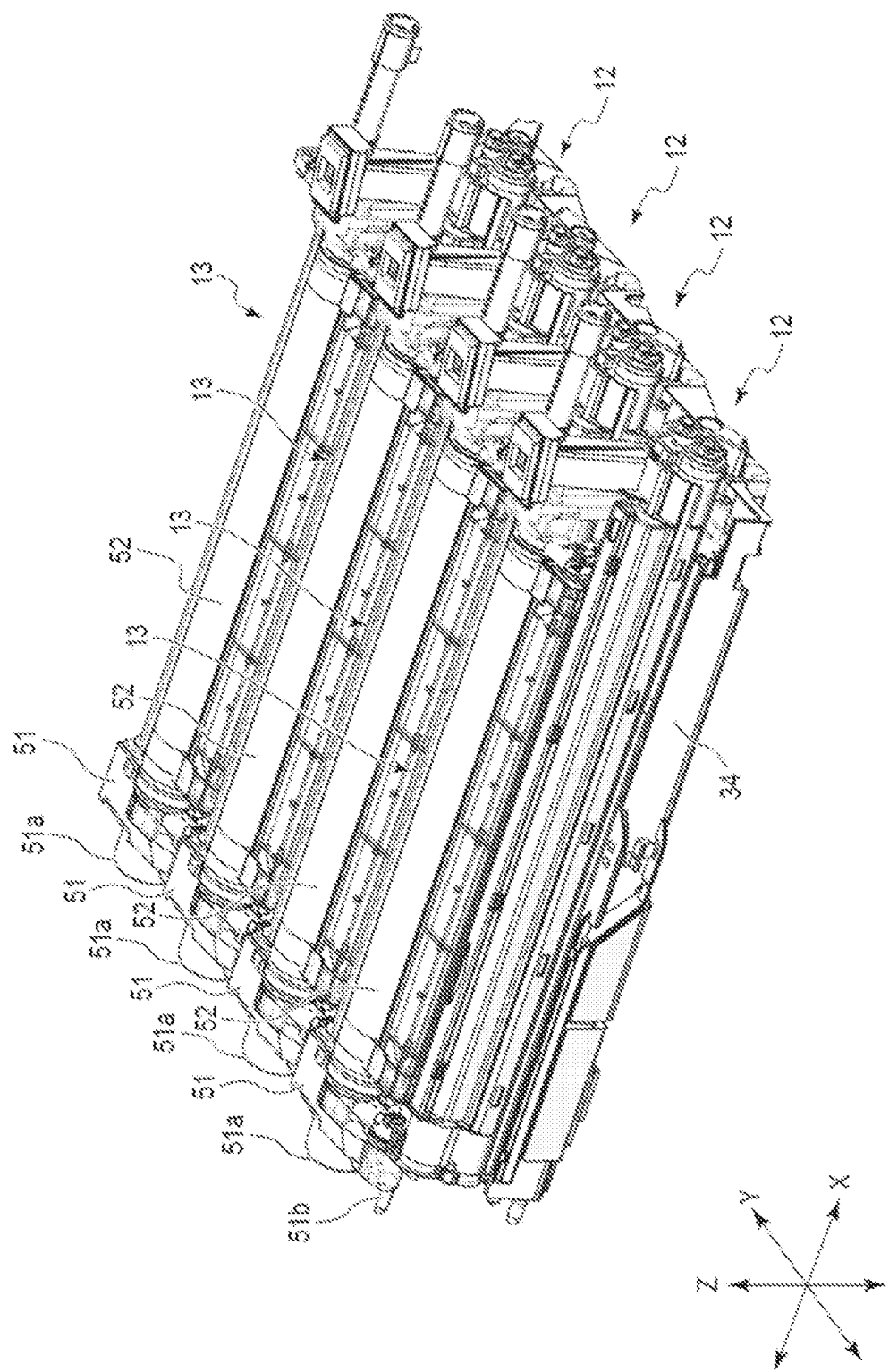
FIG. 3 is a perspective view of a part of an image forming apparatus.
Figure 4:
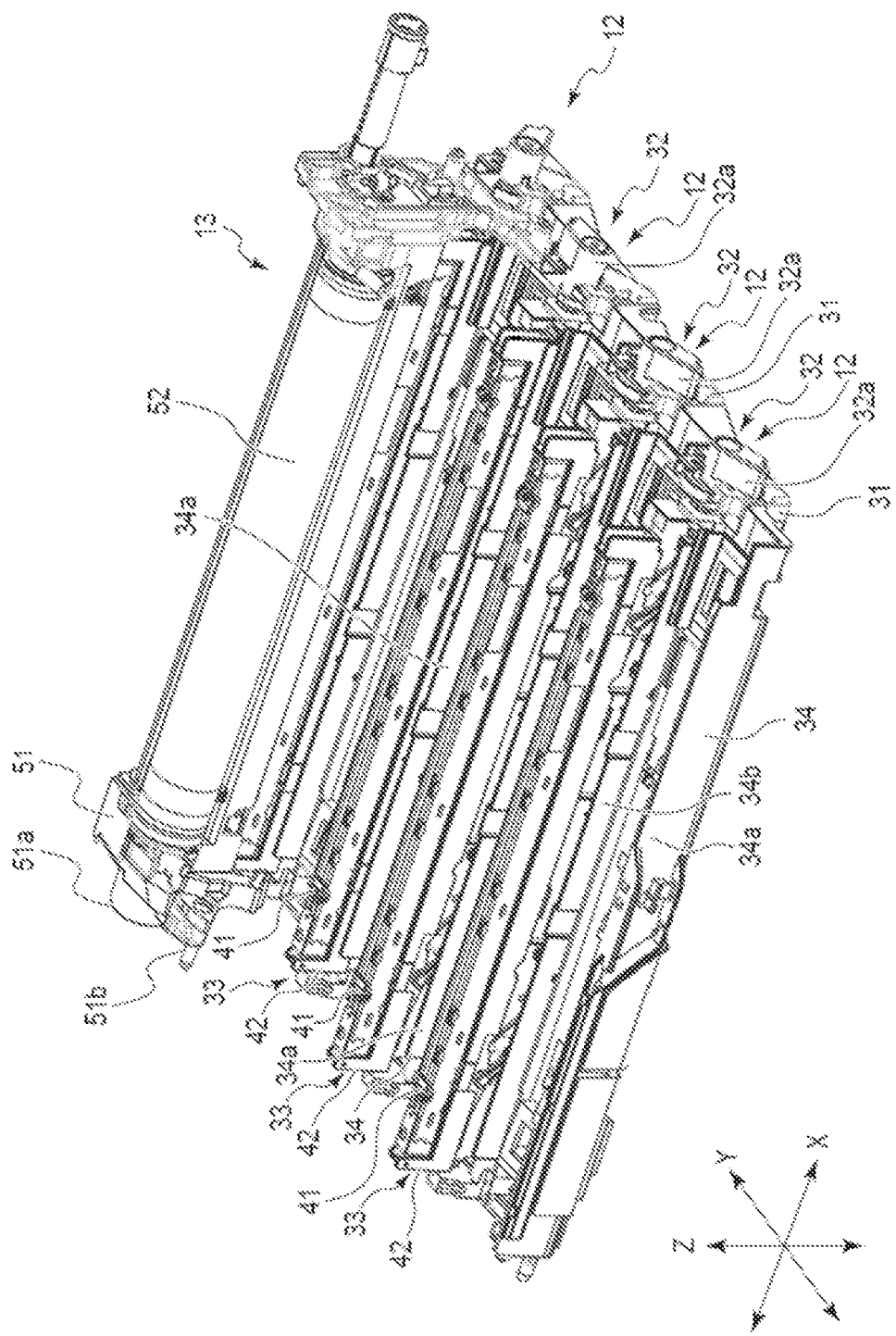
FIG. 4 is a perspective view of a part of an image forming apparatus.
Figure 5:
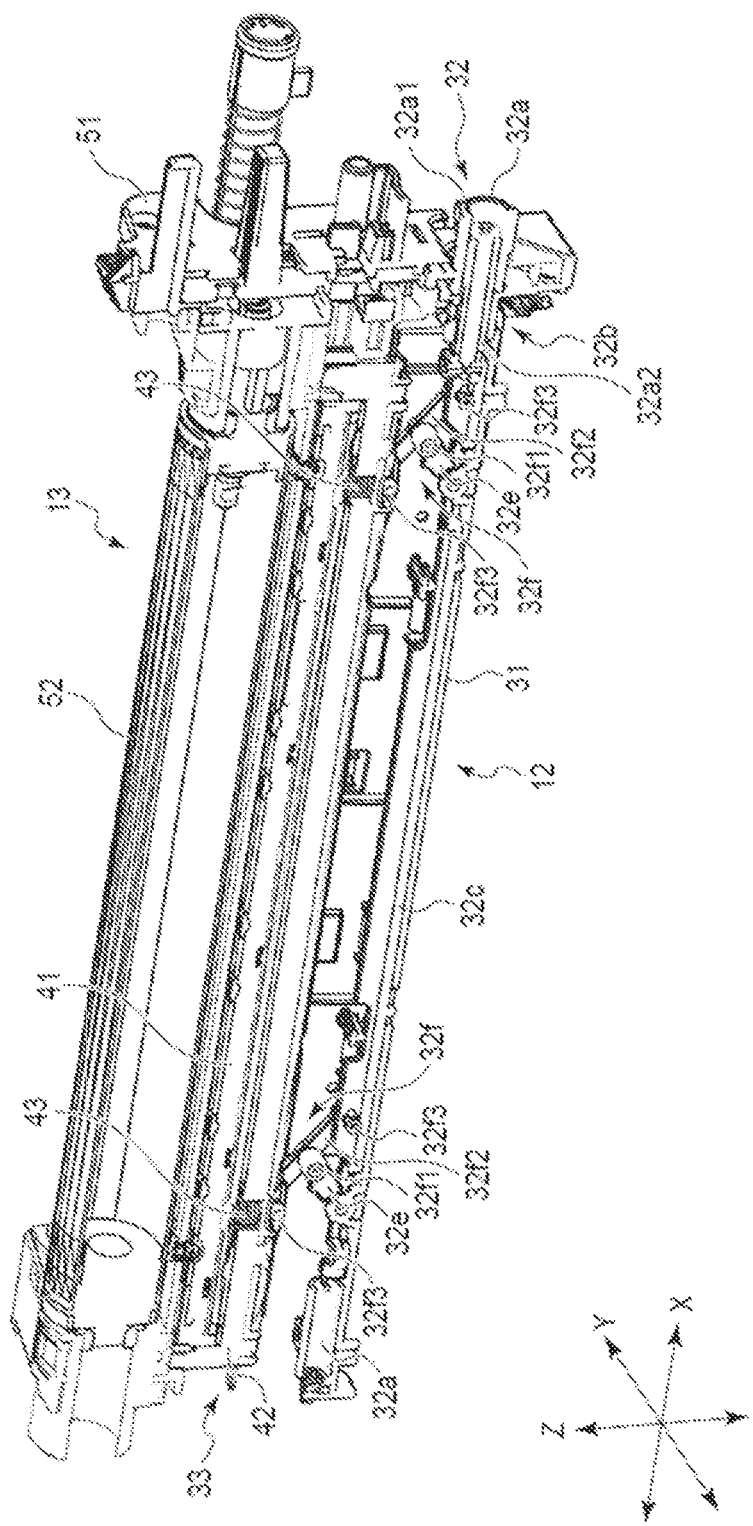
FIG. 5 is a perspective view of a solid state head unit and an image forming unit of an image forming apparatus.
Figure 6:
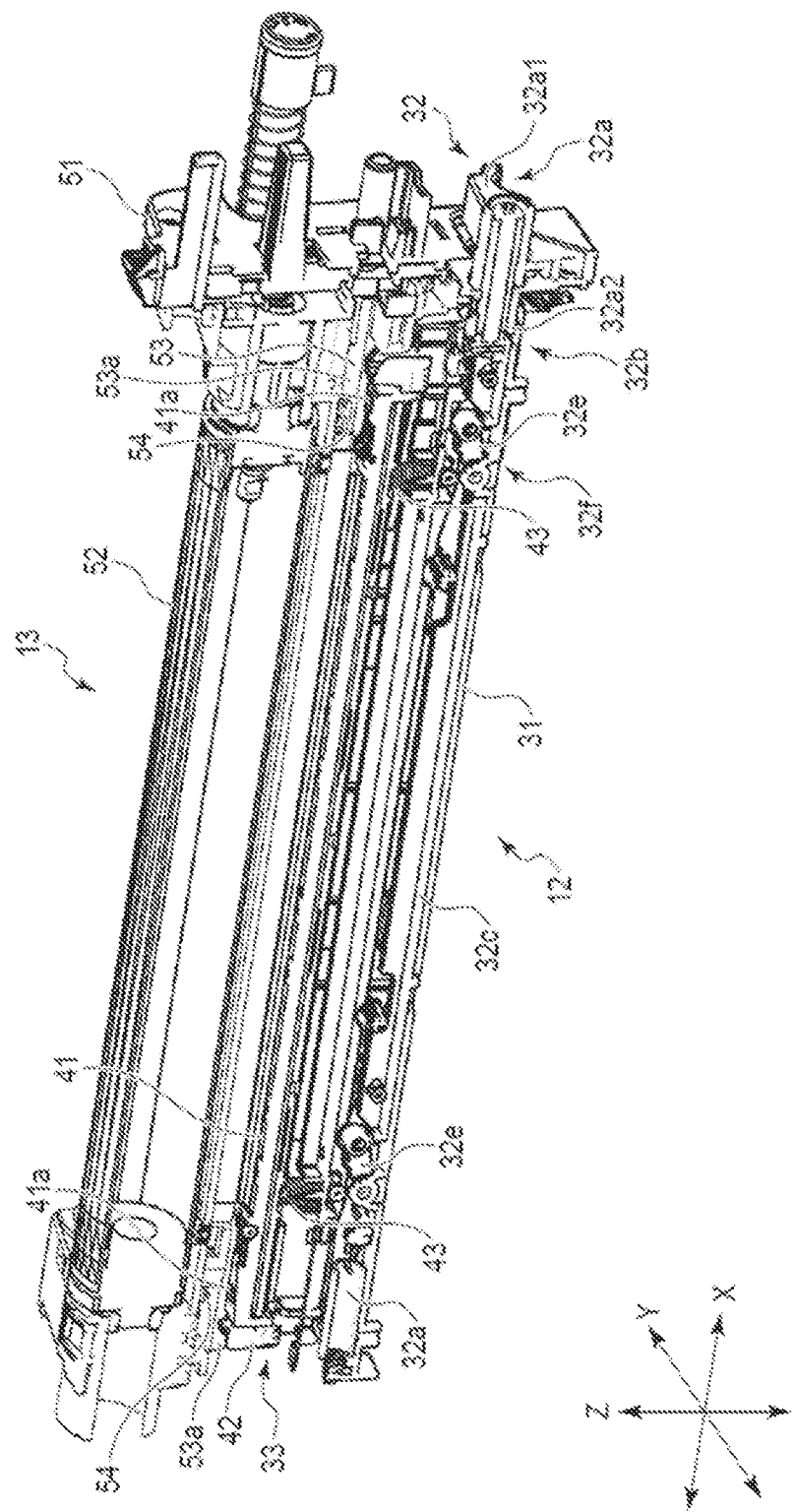
FIG. 6 is a perspective view showing of a solid state head unit and an image forming unit.
Figure 7:
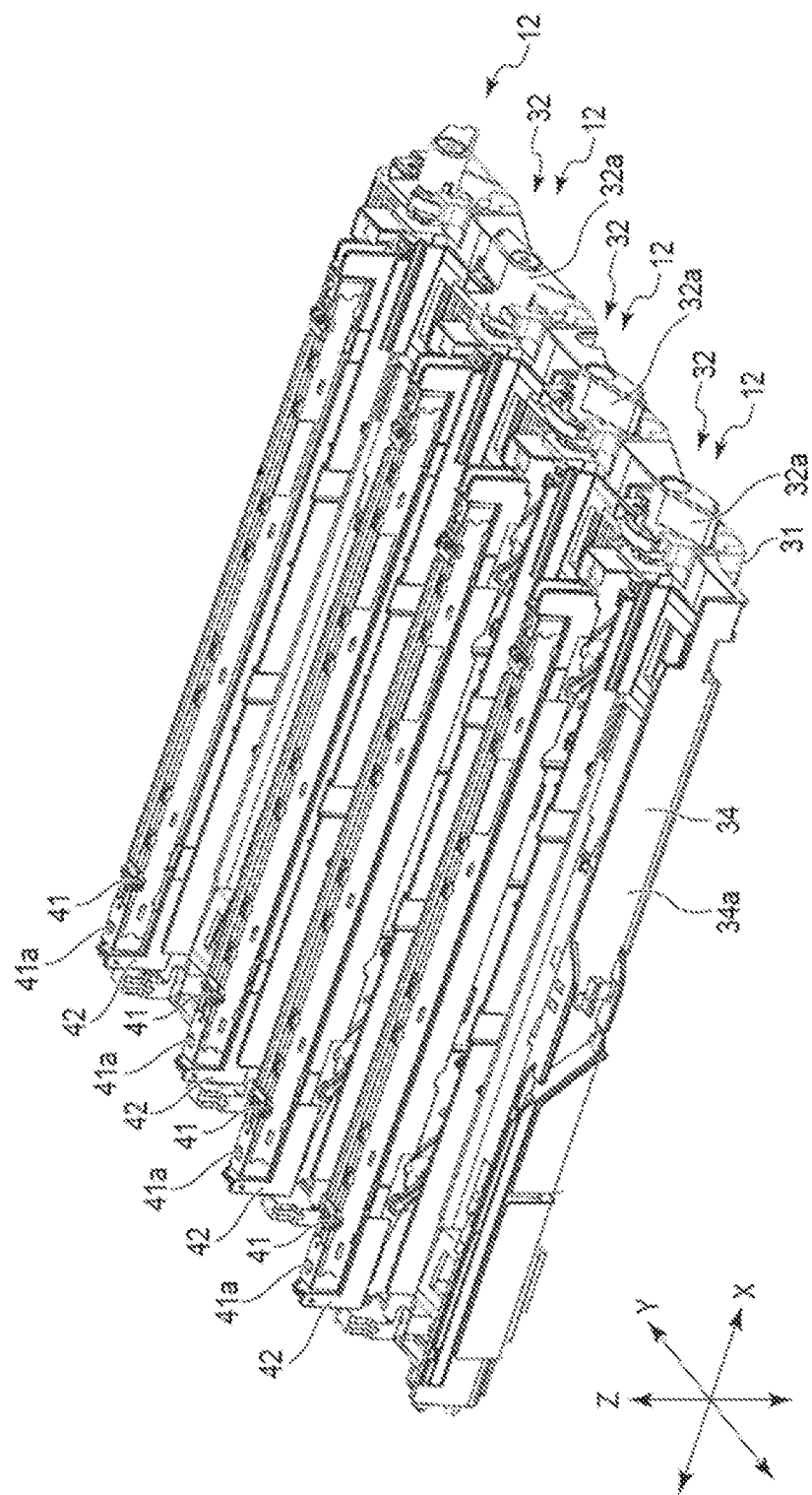
FIG. 7 is a perspective view of a solid state head unit.
Figure 8:
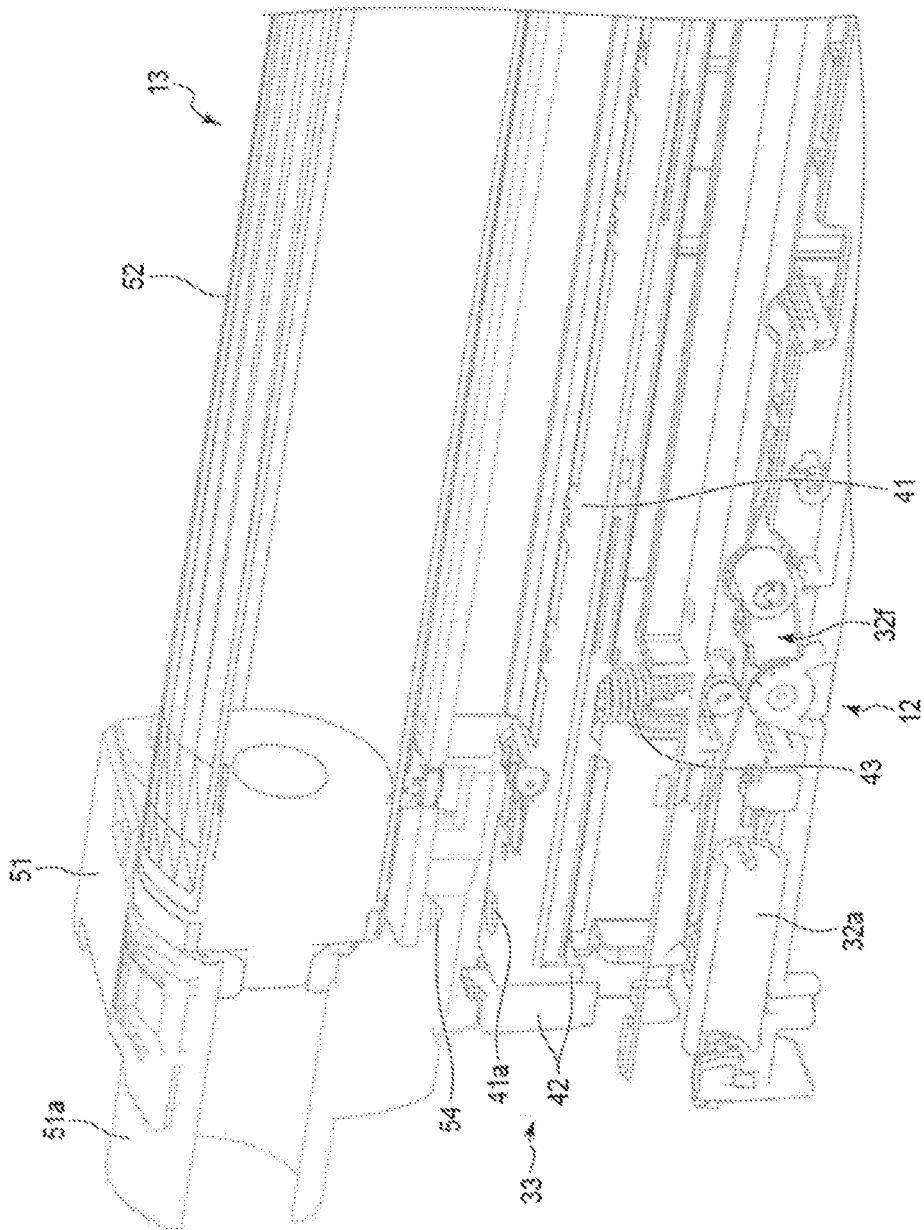
FIG. 8 is a perspective view showing a part of a solid state head unit and an image forming unit.
Figure 9:
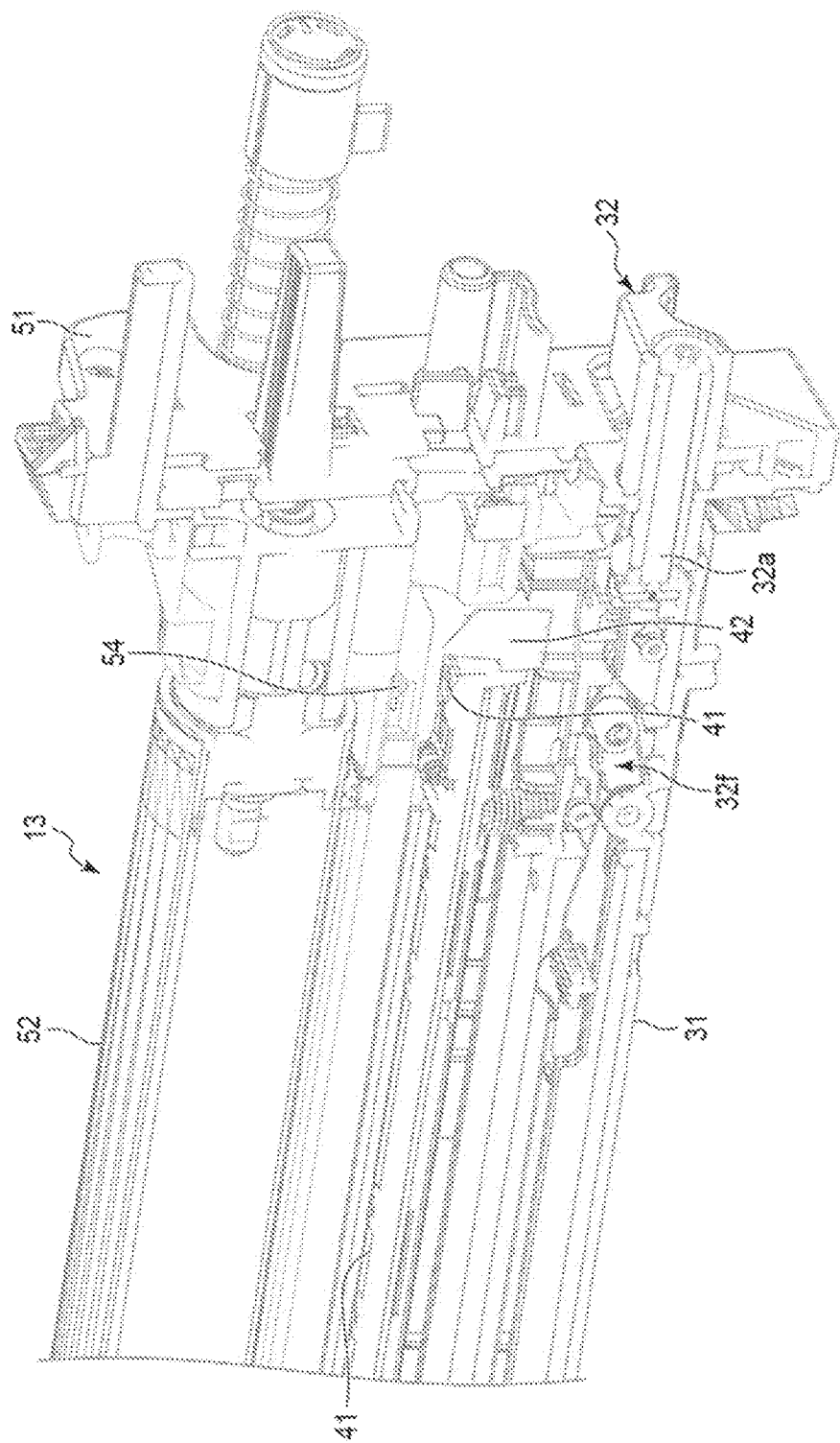
FIG. 9 is a perspective view showing a part of a solid state head unit and an image forming unit.
Figure 15:
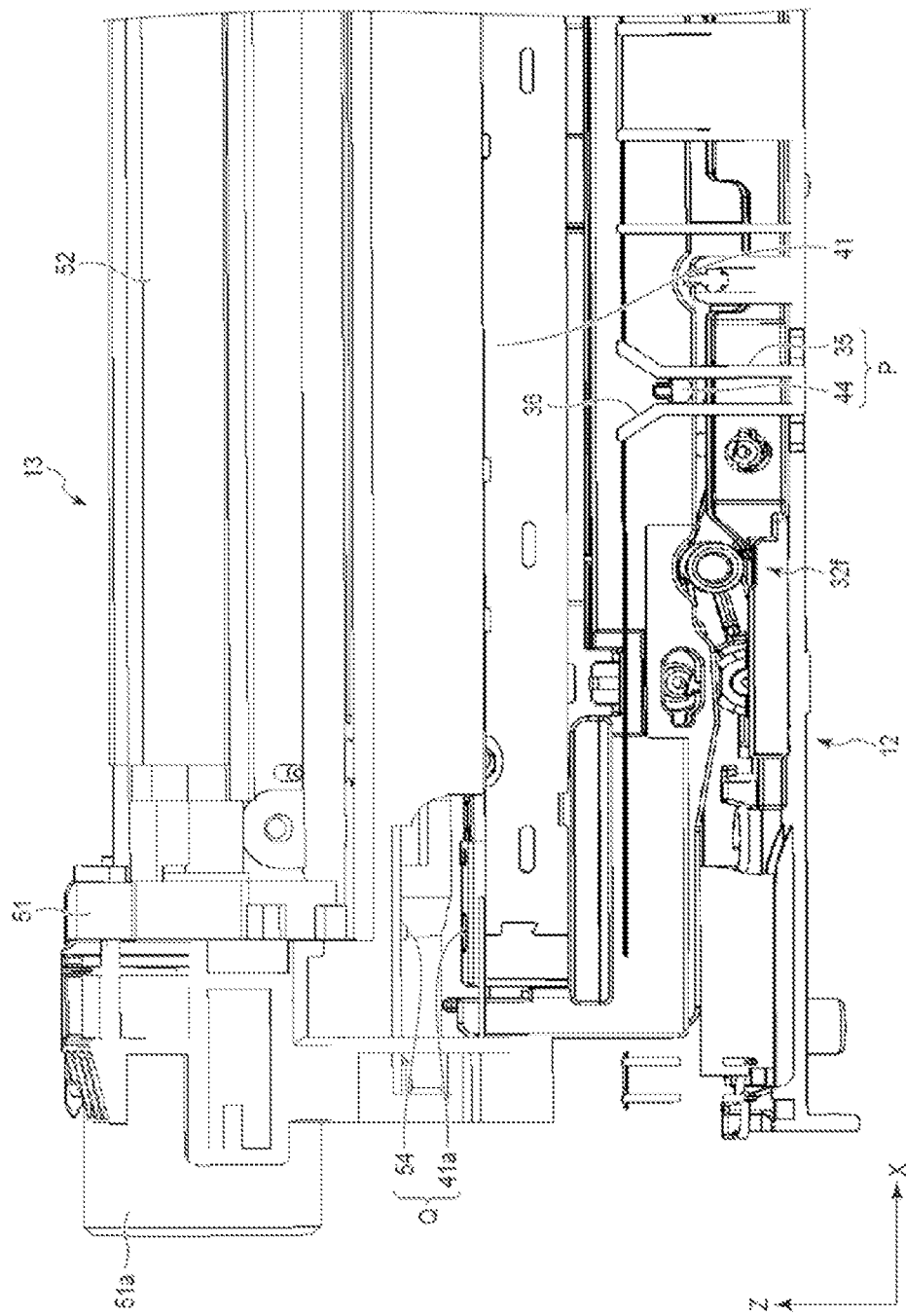
FIG. 15 is a front view of a part of a solid state head unit and an image forming unit.
Figure 16:
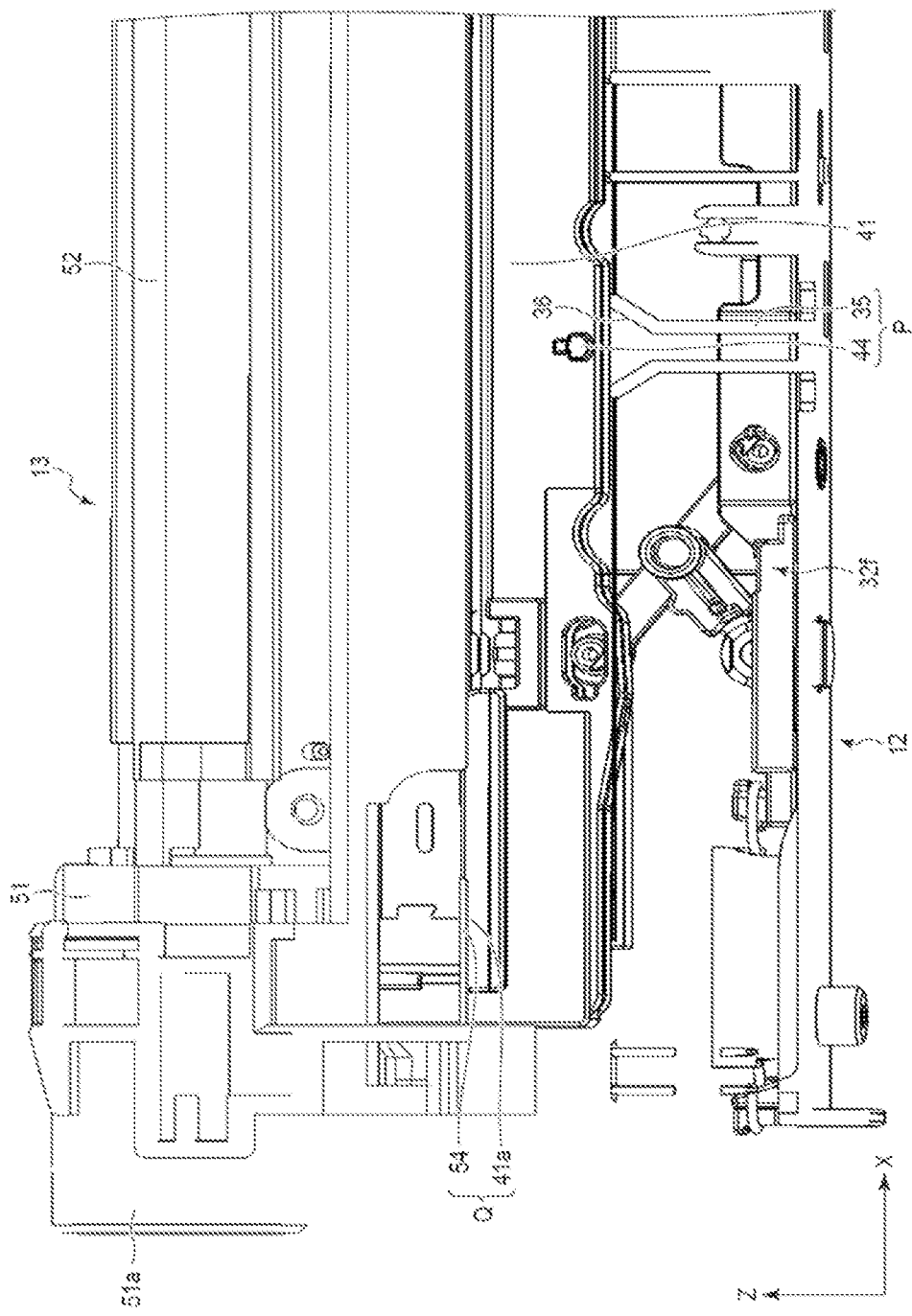
FIG. 16 is a front view of a part of a solid state head unit and an image forming unit.
Figure 17:
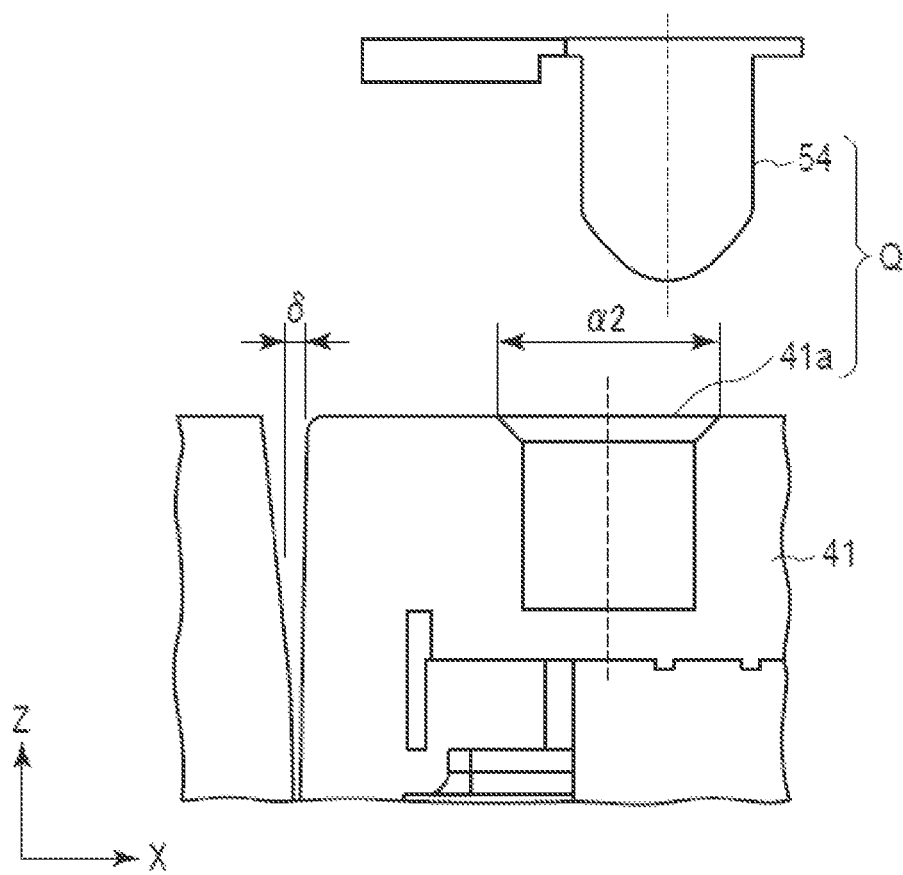
FIG. 17 is an enlarged front view of a part of a second guide in the solid state head unit and an image forming unit.
Figure 18:
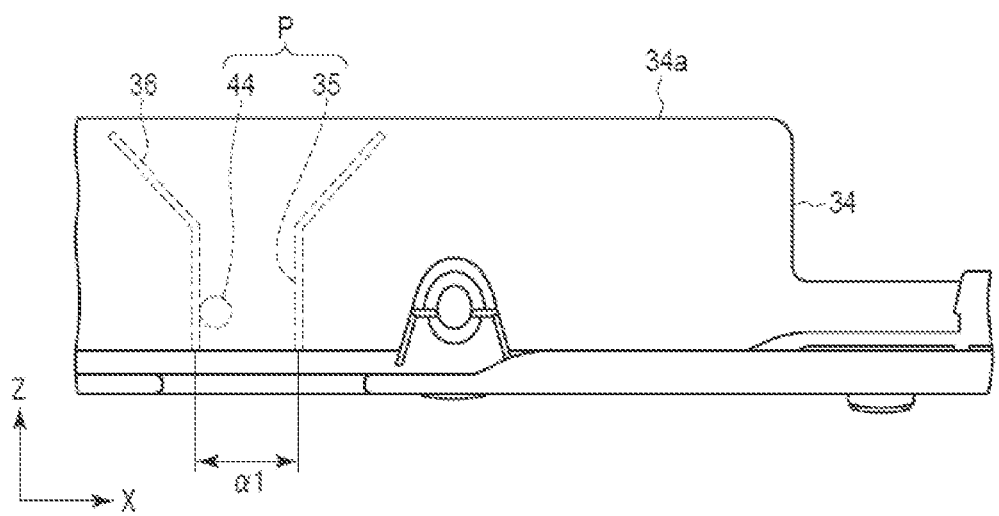
FIG. 18 is a front view schematically showing a first guide in a solid state head unit.
Figure 19:
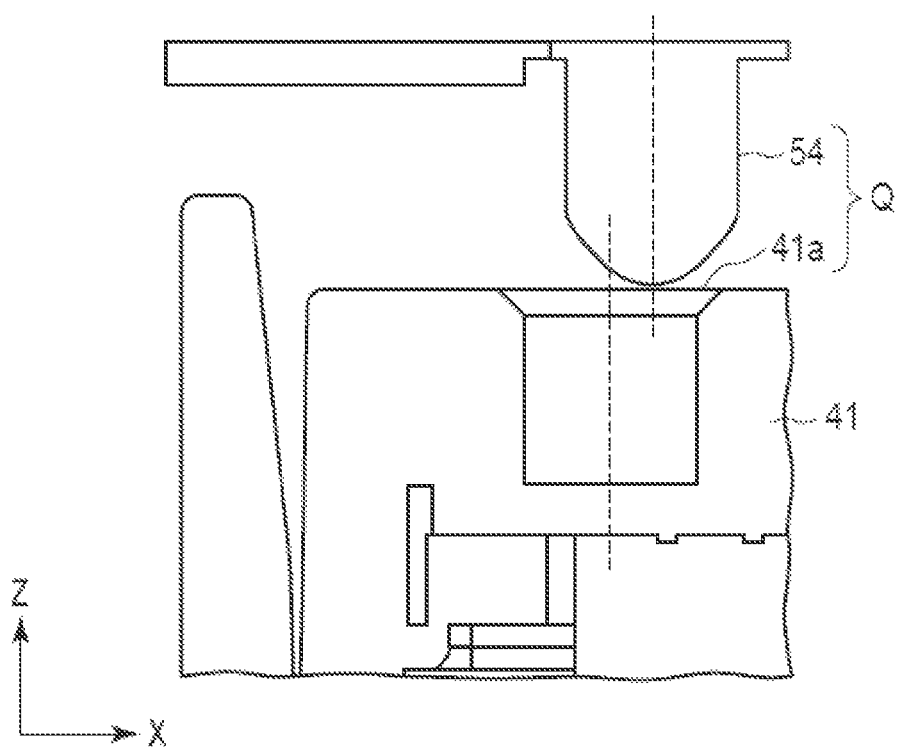
FIG. 19 is a front view schematically showing a second guide in a solid state head unit and an image forming unit.
Figure 20:
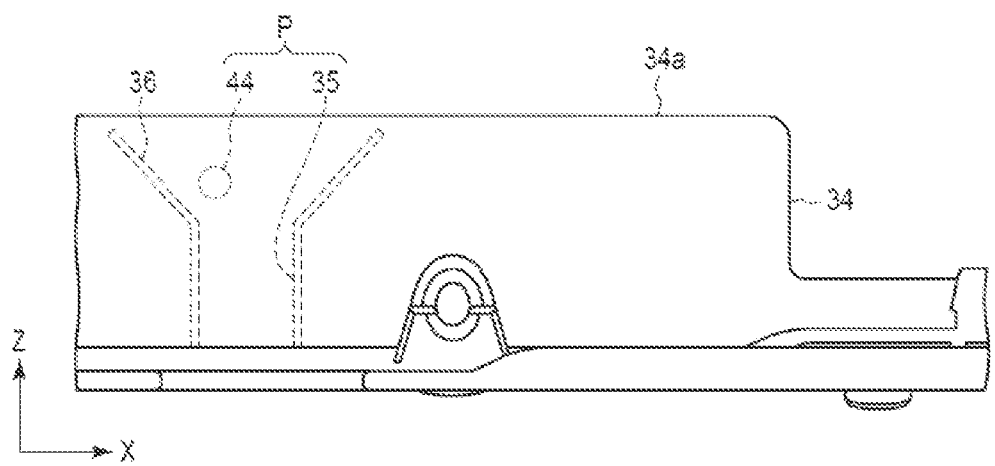
FIG. 20 is a front view schematically showing a first guide in a solid state head unit.
Figure 21:
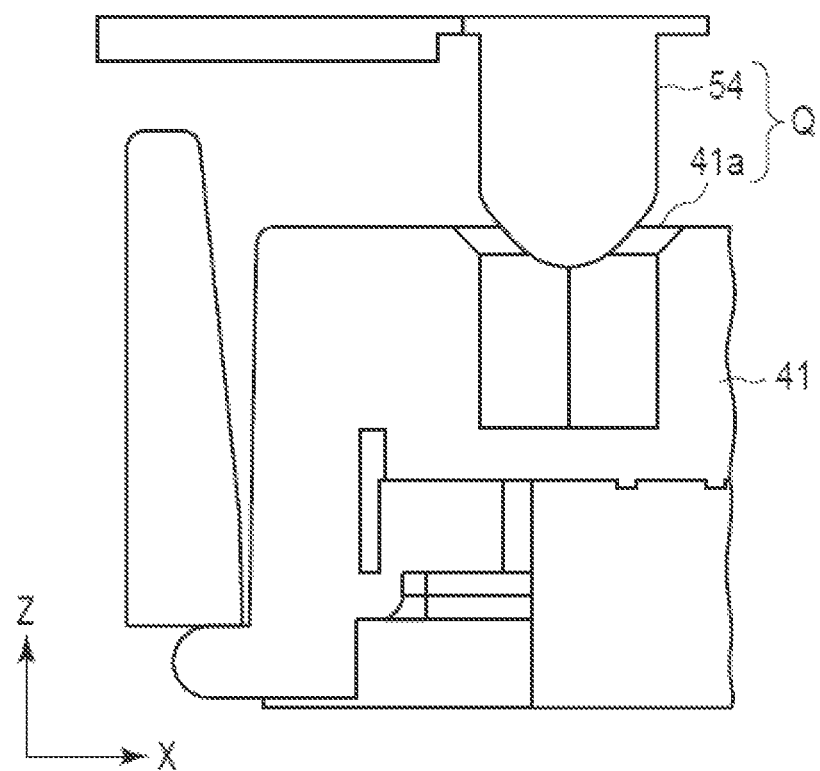
FIG. 21 is a front view schematically showing a second guide in a solid state head unit and an image forming unit.
Figure 22:
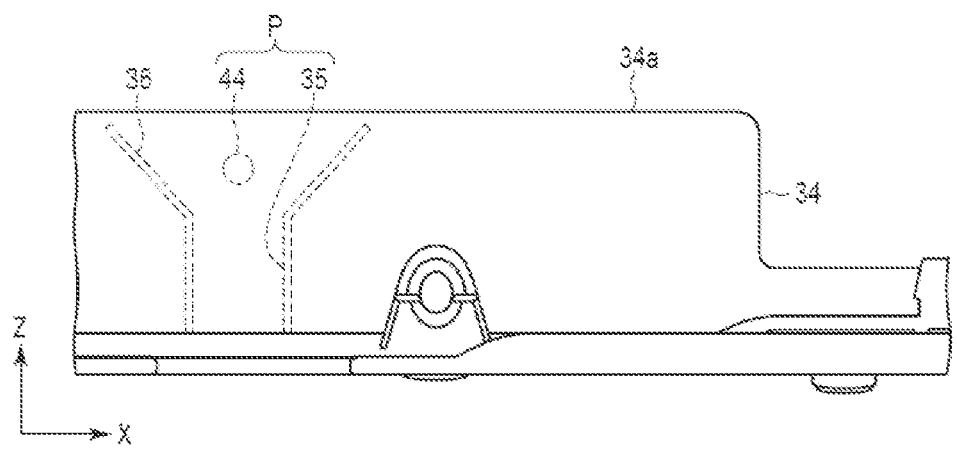
FIG. 22 is a front view schematically showing a first guide in a solid state head unit.

FIGS. 1 and 2 show the configuration of the image forming apparatus 1 in a perspective and a front view, respectively. In FIGS. 1 and 2, the decorative cover plate used with the image forming apparatus 1 has been omitted from the depiction. FIG. 3 and FIG. 4 are perspective views showing a principal configuration of the image forming apparatus 1. FIGS. 5 and 6 are perspective views showing the configuration of one solid head unit 12 and one image forming unit 13 used in the image forming apparatus 1. FIG. 7 is a perspective view showing the configuration of the solid head unit 12. FIGS. 8 and 9 are perspective views showing a part of the structure of the solid head unit 12 and the image forming unit 13. FIGS. 10 to 14 are perspective views showing the configuration of the solid head unit 12. FIG. 15 and FIG. 16 are front views showing a principal configuration of the solid head unit 12 and the image forming unit 13. FIGS. 17, 19 and 21 are front views schematically showing a solid head unit 12 during a mounting process and a second guide Q for the image forming unit 13. FIGS. 18, 20 and 22 are front views schematically showing a first guide P in the solid head unit 12 during the mounting.

In the following description, the combination of dowel 44 and a regulating rib 35 (which guides dowel 44) will be referred to as a first guide P, and the combination of projection body 54 and an opening 41a (for guiding the projection body 54) will be referred to as a second guide Q.

The image forming apparatus 1 is, for example, a multi-function peripheral (MFP) that aggregates multiple functions such as copying, scanning, and printing. As shown in FIGS. 1 and 2, the image forming apparatus 1 includes a frame 11, a plurality of solid head units 12, and a plurality of image forming units 13. As shown in FIG. 1, the image forming apparatus 1 includes, for example, an accommodating tray 14, a scanner unit 15, a transfer belt 16, a fixing device 17, a sheet discharge tray 18, a sheet transport device, and a control unit, such as a processor or the like. The image forming apparatus 1 is provided with a decorative plate on the outer surface side of the frame 11.

The number of solid head units 12 and image forming units 13 used in the image forming apparatus 1 is set according to the type of developer used in the image forming apparatus 1. In this example, a configuration in which toners of four colors (yellow, magenta, cyan and black) are used as a developer will be described, but the disclosure is not limited to this example. Accordingly, as shown in FIGS. 1 and 2, an example in which the image forming apparatus 1 includes four solid head units 12 and four image forming units 13 will be described.

As shown in FIG. 1, the frame 11 includes a front frame 21, a rear frame 22, and a plurality of connecting frames for connecting the front frame 21 to the rear frame 22. A decorative plate is provided on the outer surface side of the frame 11. The frame 11 supports each component used in the image forming apparatus 1.

The front frame 21 and the rear frame 22 are disposed opposite to each other in the X direction, which is the direction in which the image forming unit 13 is inserted into the image forming apparatus 1. Four solid head units 12 are thus fixed to the front frame 21 and the rear frame 22.

As shown in FIG. 1, the front frame 21 has an insertion port 21a configured to permit the insertion of image forming units 13 from the front frame 21 side toward the rear frame 22 along the X direction. The insertion port 21a is an opening in the front frame 21. The insertion port 21a exposes the end portion of the solid head unit 12 fixed to the frame 11. The insertion port 21a also exposes an end portion of the image forming unit 13 to the outside (of the frame 11). Specifically, the insertion port 21a permits access to the image forming unit 13 and an operation lever 32a (see FIG. 4) of the solid head unit 12 from the outside.

That is, in this example, the insertion port 21a has a shape by which four image forming units 13 can be inserted with the end portions of the four solid head units 12 being left exposed to the outside after insertion of the image forming units 13. The shape of the insertion port 21a is appropriately set depending on the number and arrangement of the solid head units 12 and the image forming units 13. In this embodiment, as shown in FIG. 2, the image forming unit 13 is disposed above the solid head unit 12 in the Z direction, and the height positions (levels) in the Z direction of the four solid head units 12 and four image forming units 13 are gradually changed from one side toward the other side along the Y direction. Thus, the shape of the insertion port 21a can be set to a shape in which the solid head unit 12 and the image forming unit 13 can be arranged as appropriate for the image forming apparatus 1.

As shown in FIG. 4 to FIG. 7, the solid head unit 12 includes a base 31, a lifting mechanism 32, a solid head 33, and a first guide member 34. The solid head unit 12 is long in the X direction, and is fixed to the frame 11 at an end in the X direction.

The base 31 is fixed to the front frame 21 and the rear frame 22 by a fastening member such as a screw. The base 31 supports a portion of the lifting mechanism 32.

The lifting mechanism 32 reciprocates the solid head 33 up and down with respect to the base 31. The reciprocating movement of the solid head 33 with respect to the base 31 will be further described. As shown in FIGS. 4 to 7, the lifting mechanism 32 includes, for example, an operation lever 32a, a conversion mechanism 32b, a slider 32c, an urging member 32d, a support member 32e, and a link 32f.

The operation lever 32a is rotatable within a predetermined angular range when manipulated. As shown in FIG. 5, the operation lever 32a includes an operation portion 32a1, which can be rotated by an operator (user), and a shaft portion 32a2, which is integrally provided with the operation portion 32a1. The shaft portion 32a2 rotates in accordance with the rotation of the operation portion 32a1.

The conversion mechanism 32b converts the rotational movement of the shaft portion 32a2 into a displacement of the shaft portion 32a2. In the posture in which the solid head unit 12 is fixed to the frame 11, the axial direction of the shaft portion 32a2 is along the X direction.

As a specific example, as shown in FIGS. 5 and 6, the conversion mechanism 32b includes a projection 32b1 provided on a part of the outer peripheral surface of the shaft portion 32a2, and a cylindrical body 32b3 (see FIG. 10) having a groove 32b2 (see FIG. 10) that covers the shaft portion 32a2 and extends in a direction inclined with respect to the circumferential direction and the axial direction. By way of example, the groove 32b2 is an opening which extends helically (spirals) along the circumferential surface of the cylindrical body 32b3. As the operation portion 32a1 is operated (moved by an operator) and shaft portion 32a2 rotates, the projection 32b1 provided in shaft portion 32a2 is guided by the groove 32b2, thereby the converting mechanism 32b converts rotation of shaft portion 32a2 into movement along the axial direction in addition to the rotational movement of shaft portion 32a2. The cylindrical body 32b3 is fixed to, for example, the base 31.

The slider 32c is fixed to the shaft portion 32a2 at an end in the axial direction of the shaft portion 32a2. The slider 32c is fixed to, for example, the shaft portion 32a2 by a fastening member such as a screw. As a specific example, the slider 32c is fixed to the shaft portion 32a2 such that the shaft portion 32a2 is rotatable about an axis along the X direction with respect to the slider 32c. The slider 32c is supported by the base 31 so as to be movable in the X direction. The slider 32c has the shaft portion 32a2 fixed to one side in the X direction and an urging member 32d connected to the other side. When the slider 32c moves along the X direction, the link 32f is operated in the X direction. As a specific example, the slider 32c rotatably supports one end of the link 32f.

The urging member 32d biases the slider 32c in one direction. As one specific example, the urging member 32d is a coil spring or the like. The urging member 32d biases the slider 32c in the direction away from the operation lever 32a along the X direction. The urging member 32d is supported at one end by base 31 and is supported at the other end by slider 32c.

One end of the support member 32e is rotatably supported by the base 31, and the other end of the support member 32e is rotatably supported by a first shaft 32f1 of the link 32f. The first shaft 32f1 will be described further below. For example, two support members 32e are provided.

The link 32f is provided, for example, at two places along the X direction. As shown in FIG. 5, the link 32f includes a first shaft 32f1 rotatably supported by the support member 32e, a link body 32f2 provided at an end portion in the axial direction of the first shaft 32f1, and a pair of second shaft 32f3 provided at both ends of the link 32f.

The link body 32f2 is a plate-like member or a rod-shaped member long in one direction. The link body 32f2 is provided with a first shaft 32f1 at the center in the longitudinal direction, and a second shaft 32f3 is provided at both ends in the longitudinal direction. A pair of second shafts 32f3 protrude from the main surfaces of the link body 32f2 in the same direction as the first shaft 32f1. As shown in FIG. 5, a pair of second shafts 32f3 are rotatably supported by holes formed in a side surface of the slider 32c and holes provided in the side surfaces of the solid head 33.

In such a link 32f, when the slider 32c is moved in the X direction, the second shaft 32f3 supported by the slider 32c moves in the X direction, so that the force in the X direction is applied to the end portion on the slider 32c side of the link body 32f2. However, the slider 32c is moved only in the X direction, and the second shaft 32f3 of the link body 32f2 is supported by the solid head 33. Therefore, the first shaft 32f1 provided at the center in the longitudinal direction of the link body 32f2 presses the support member 32e, and the support member 32e rotates with respect to the base 31 around one end of the support member 32e. At this time, the link body 32f2 rotates around the first shaft 32f1, so that the angle of the link body 32f2 with respect to the X direction is changed, and the second shaft 32f3 supported by the solid head 33 is moved up and down. As described above, when the slider 32c moves in the X direction, the link body 32f2 and the support member 32e are rotationally moved in the link body 32f2, so that the second shaft 32f3 on the solid head 33 side moves up and down, and the solid head is moved up and down with respect to the base 31.

The solid head 33 is an exposure apparatus. The solid head is a light source, such as an LED or LED array, for selectively writing image (print) data for forming an electrostatic latent image on the image forming unit 13. As shown in FIG. 6, the solid head 33 includes a print head 41, a holder 42, and an urging member 43. When the solid head 33 rises relative to the base 31 and is positioned in a predetermined position with respect to the image forming unit 13, for example, a part of the leading edge of the print head 41 or the holder 42 in the upward direction comes into contact with a portion of the image forming unit 13. The wall surface in the Y direction of the holder 42 is provided with dowel 44.

The print head 41 is long in one direction. The print head 41 is, for example, an LED print head using an LED from which light is emitted. The LED is utilized as a light source in this example, but the disclosure is not limited thereto. When the image forming unit 13 is exposed to light, the print head 41 is disposed in a predetermined positional relationship with respect to the photosensitive drum 52 of the image forming unit 13, in the axial direction of the photosensitive drum 52 and in the radial direction of the photosensitive drum 52. As shown in FIG. 7, the print head 41 has a guide opening 41a formed at the front end in the longitudinal direction of the solid head 33. Also, the print head 41 includes a contact surface on which the end faces of the end portions formed with opening 41a are in contact with a part of the image forming unit 13, for example. Opening 41a is a circular or elliptical hole. For example, the opening 41a may be formed in a chamfered shape in an annular flat surface or a curved surface at a ridge portion between the front end surface and the inner peripheral surface of the print head 41. In addition, the print head 41 has a contact portion and a projection which contact with one of the image forming units 13 so as to be in a predetermined position with respect to the photosensitive drum 52 of the image forming unit 13.

The holder 42 supports the print head 41. As shown in FIG. 7, as one example, the holder 42 supports the lower surface side opposite to the photosensitive drum 52 of the print head 41 and the longitudinal end(s) of the print head 41 in the vertical direction of the solid head 33.

The urging member 43 biases (pushes) the print head 41 in toward the photosensitive drum 52. A plurality of the urging members 43 are provided. As shown in FIGS. 5 and 6, the urging member 43 is between the print head 41 and the holder 42 at two positions on near both ends in the longitudinal direction of the print head 41. The urging member 43 is, for example, a coil spring.

The first guide member 34 can be fixed to at least one of the frame 11 and the base 31. The first guide member 34 helps to guide the movement of the image forming unit 13 along the X direction when the image forming unit 13 is being inserted into the inserting port 21a. The first member guide 34 also guides movement of the solid head unit 12 in the X direction. The first guide member 34 is a rail that guides the image forming unit 13 by contacting an outer surface part of the image forming unit 13 when the image forming unit 13 is being inserted through the insertion port 21a. As shown in FIG. 4, for example, the first guide member 34 comprises a pair of rails 34a and 34b extending in the X direction that slidably engage a part of the outer surface of the image forming unit 13. A regulating rib 35 (see FIG. 13) and an auxiliary guide 36 (see FIG. 15) are formed on the inner wall surface of the rail 34a. The regulating rib 35 (see FIG. 13) and the auxiliary guide 36 can be integral parts of rail 34a. The dimension in the X direction of the regulating rib 35 is set as described later.

The image forming unit 13 is, for example, an electrophotographic process unit (EPU). In this embodiment, as shown in FIG. 2, for example, an image forming unit 13 containing yellow toner, an image forming unit 13 containing magenta toner, an image forming unit 13 containing cyan toner, and an image forming unit 13 containing black toner are arranged in this respective order from the primary side toward the secondary side along the conveying direction of the sheet.

As shown in FIGS. 5 and 6, each image forming unit 13 includes a drum case 51, a photosensitive drum 52, a second guide member 53, and a projection body 54. The image forming unit 13 includes, for example, a developing roller, a charging unit, a toner tank, and a cleaner case.

As shown in FIGS. 5 and 6, the drum case 51 is long in one direction. The drum case 51 rotatably supports the photosensitive drum 52. When the image forming unit 13 is inserted from the insertion port 21a, the drum case 51 comes into contact with the rails 34a and 34b and this guides the movement of the image forming unit 13 along the X direction.

The photosensitive drum 52 is initially charged with a uniform charge on its surface and an electrostatic latent image is formed on the surface of the photosensitive drum 52 by selectively exposing the surface to light. Toner adhering to the electrostatic latent image on the photosensitive drum 52 can be subsequently transferred to a sheet.

The second guide member 53 is formed, for example, as an integral part of the drum case 51. For example, second guide member 53 may be integrally molded with drum case 51 or may be physically attached to drum case 51 in some other manner.

When the image forming unit 13 is inserted into the insertion port 21a, the second guide member 53 helps to position the image forming unit 13 relative to the solid head 33 in the X and Z directions when the solid head 33 and the image forming unit are installed. Also, when solid head 33 is raised toward photosensitive drum 52, the second guide member 53 serves to guide the movement of solid head 33 such that solid head 33 will be positioned at a predetermined position with respect to photosensitive drum 52 appropriate for printing.

The projection body 54 can also be referred to as a "dowel" and/or a "pin" in this context. The projection body 54 is, for example, a projection provided on the drum case 51. The projection body 54 is formed, for example, in a cylindrical shape, and a top portion at the tip end is chamfered to an annular flat surface or may be a curved surface, or a tip end thereof may be reduced in diameter (narrowed) relative to the main portion of the body. A projection body 54 is provided proximate to both ends of the second guide member 53 in the axial direction of the photosensitive drum 52. Each projection body 54 is ultimately inserted into an opening 41a provided in the print head 41. When projection bodies 54 are inserted into the openings 41a this serves to appropriately position the photosensitive drum 52 in the longitudinal direction (scanning direction) relative to the solid head 33. Furthermore, when the projection body 54 is inserted into the opening 41a this restricts the movement of the drum case 51 in the X direction, and thus fixes the image forming unit 13 to the frame 11 and the solid head unit 12.

The developing roller supplies toner in the toner tank to the surface of the photosensitive drum 52. The charging unit forms a uniform charge on the surface of photosensitive drum 52. The toner tank contains toner. The cleaner case collects excess toner from the photosensitive drum 52.

The accommodating tray 14 stores sheets to be printed such as paper, labels, film, or the like. The accommodating tray 14 is arranged below the frame 11, for example below the solid head units 12 and image forming units 13. The accommodating tray 14 includes a pickup roller and takes out each sheet to be printed according to the image forming process. The sheet is removed and then conveyed to the image forming unit 13, more particularly to the transfer belt 16 by a conveying device or the like, such as various rollers and/or conveyance belts.

The scanner unit 15 reads images on a document or the like that has been loaded for reading on a document platen or auto document feeder. The scanner unit 15 includes, for example, a feed tray 15a.

The transfer belt 16 functions to transfer the toner adhering to the photosensitive drum 52 to the sheet. The fixing device 17 fixes the toner image transferred to the sheet to the sheet with heat and/or pressure.

The sheet discharge tray 18 receives the discharged sheet after the toner has been fixed to the sheet. The conveying device transports sheets from accommodating tray 14 to sheet discharge tray 18 during the printing process. For example, the conveying device comprises a plurality of rollers in the frame 11, and a driving device (e.g., a motor or motors) for rotating the rollers. In FIG. 1 and FIG. 2, sheet discharge tray 18 is shown with the decorative plate being omitted from the depiction.

The control unit of the image forming apparatus 1 controls each of the described components to perform an image forming process on a sheet or the like. In this context, the image forming process includes: a charging processing for forming a uniform electric charge on the photosensitive drum 52 by controlling the charging unit, an exposure processing for controlling the solid head unit 12 to form an electrostatic latent image on the photosensitive drum 52, a developing process for adhering toner to the electrostatic latent image formed on the photosensitive drum 52, a transfer process for transferring toner from the photosensitive drum 52 to the sheet by the transfer belt 16 or the like, and a fixing operation for fixing the toner to the sheet using the fixing device 17.

Next, an exchange or replacement of an image forming unit 13 will be described as an example of an attaching and detaching operation. The image forming unit 13 must generally be removed then replaced when toner has been consumed since the toner is a consumable product. As another example of the attachment and detachment of the image forming unit 13, the image forming unit 13 may occasionally need to be temporarily detached/separated from the image forming apparatus 1 when the solid head 33 is being cleaned.

Figure 10:
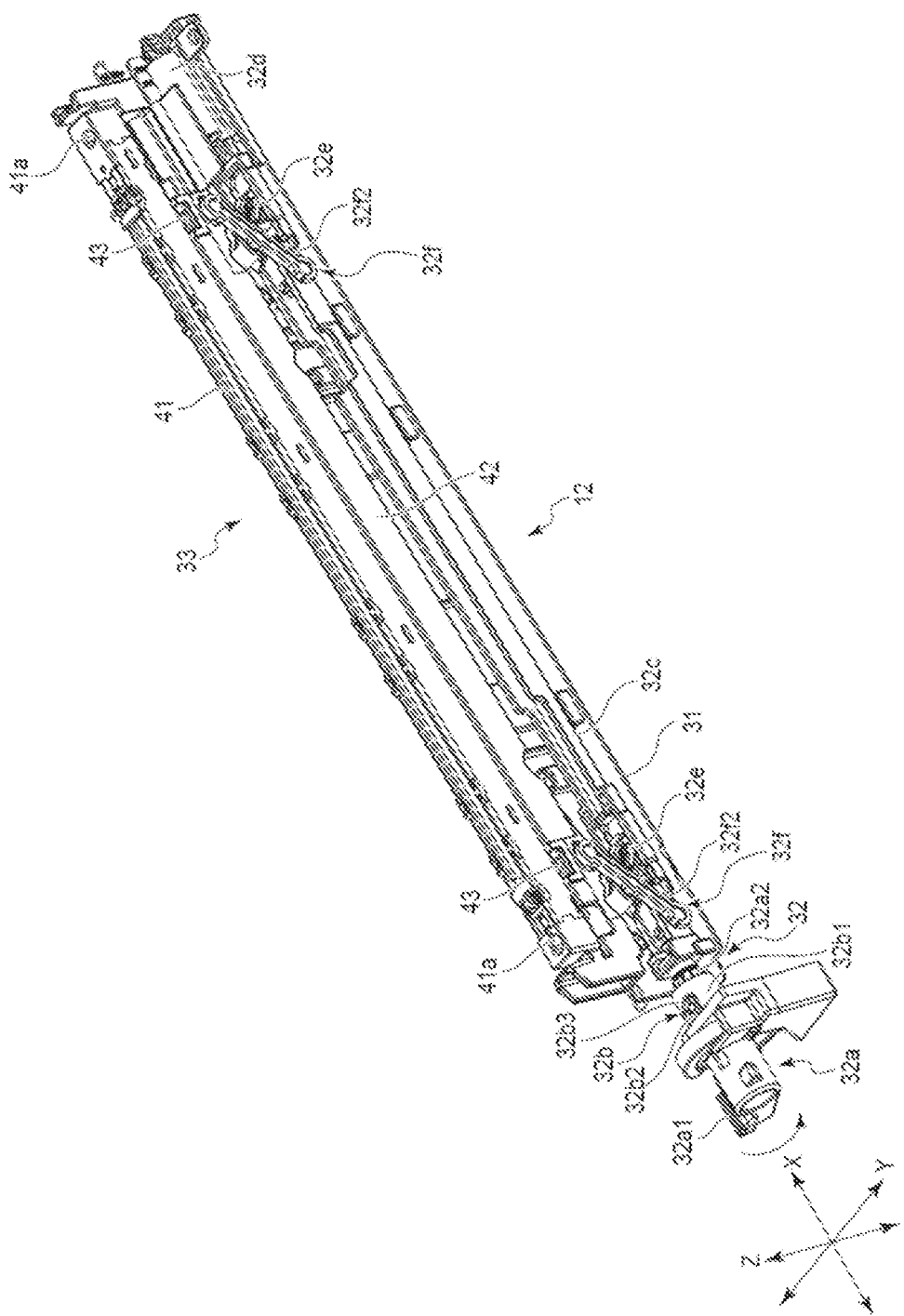
FIG. 10 is a perspective view of a solid state head unit.
Figure 12:
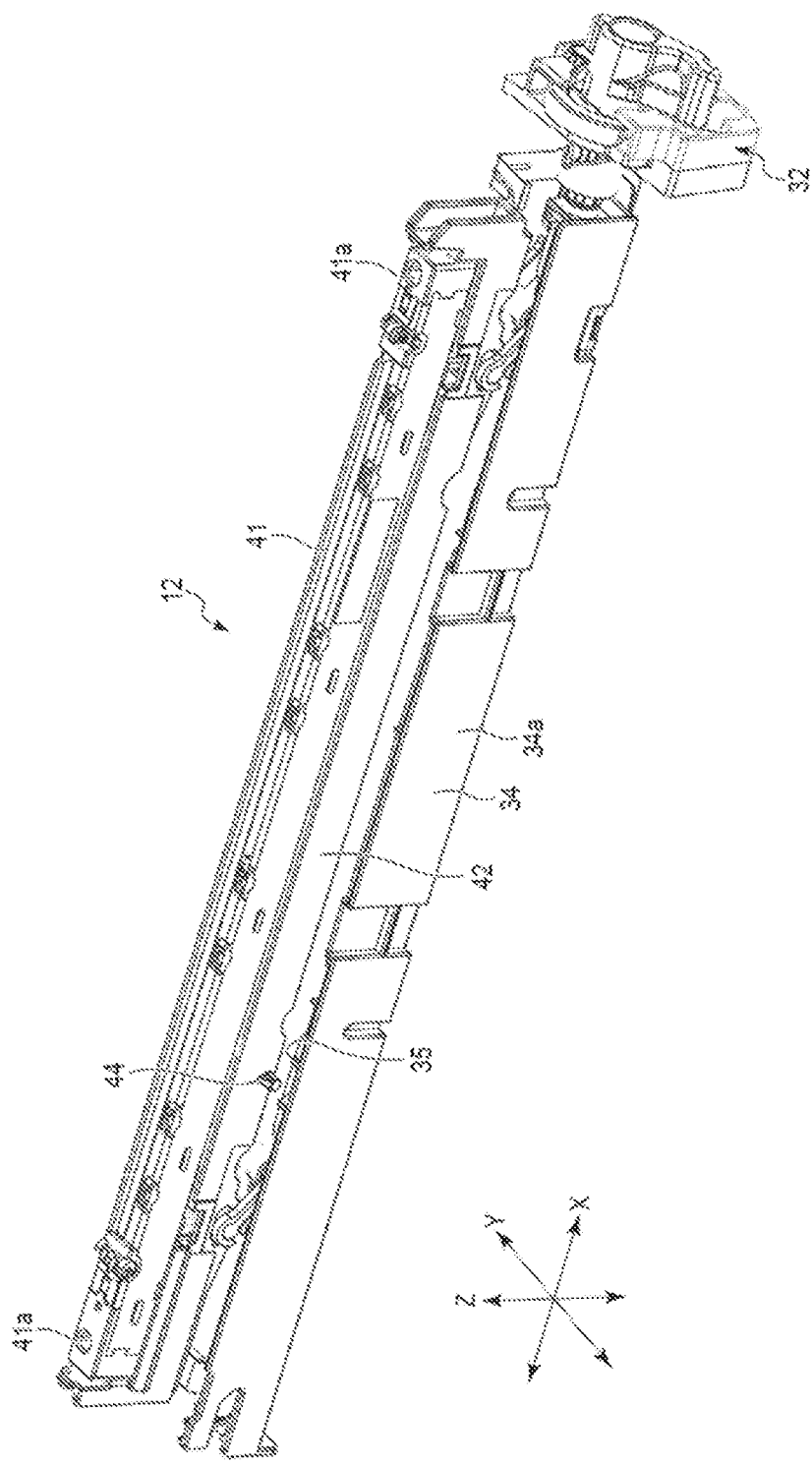
FIG. 12 is a perspective view of a solid state head unit.
Figure 13:
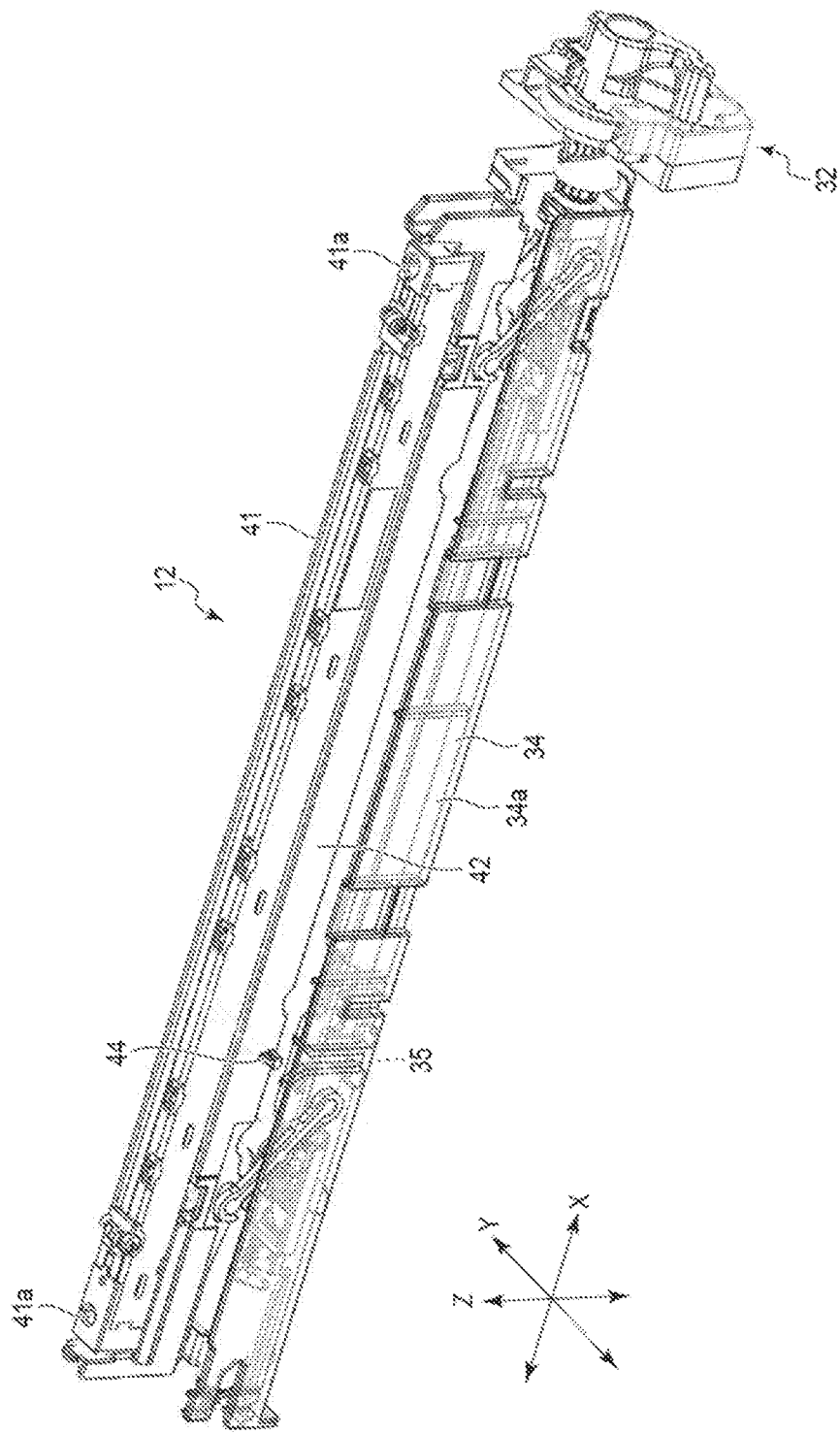
FIG. 13 is a perspective view of a solid state head unit.

First, as shown in FIGS. 10, 12 and 13, the operator operates the operation lever 32a of the solid head unit 12 for the image forming unit 13 to be removed. Specifically, when the operator rotates the operation portion 32a1 of the solid head unit 12 in the direction indicated by the arrow in FIG. 10, the shaft portion 32a2 rotates following the rotation of the operation portion 32a1. When the shaft portion 32a2 rotates, the projection 32b1 provided in the shaft portion 32a2 shown in FIG. 10 moves along the groove 32b2 of the cylindrical body 32b3, and the shaft portion 32a2 moves from the rear side to the front side along the X direction in addition to the movement in the rotation direction.

When the shaft portion 32a2 moves in the X direction, the slider 32c fixed to the shaft portion 32a2 also moves along the X direction. When the slider 32c is moved from the rear side to the front side along the X direction, the support member 32e and the link body 32f2 are rotationally moved, and the solid head 33 is lowered toward the base 31.

When the solid head 33 is lowered toward the base 31, the projection body 54 of the image forming unit 13 is removed from the opening 41a. Thereby, the regulation of the image forming unit 13 in the X direction by the projection body 5 is ended. However, the dowel 44 is at this time guided to the lower end of the regulating rib 35, and the movement in the X direction of the solid head 33 is restricted.

Next, the operator pulls out the image forming unit 13 along the X direction. In this operation, the image forming unit 13 is guided by the first guide member 34 while moving in the X direction. That is, when the drum case 51 is being moved in the direction away from the rear frame 22, the drum case 51 moves in the X direction while being in contact with the first guide member 34. Ultimately, the image forming unit 13 can be pulled out from the front frame 21.

Figure 14:
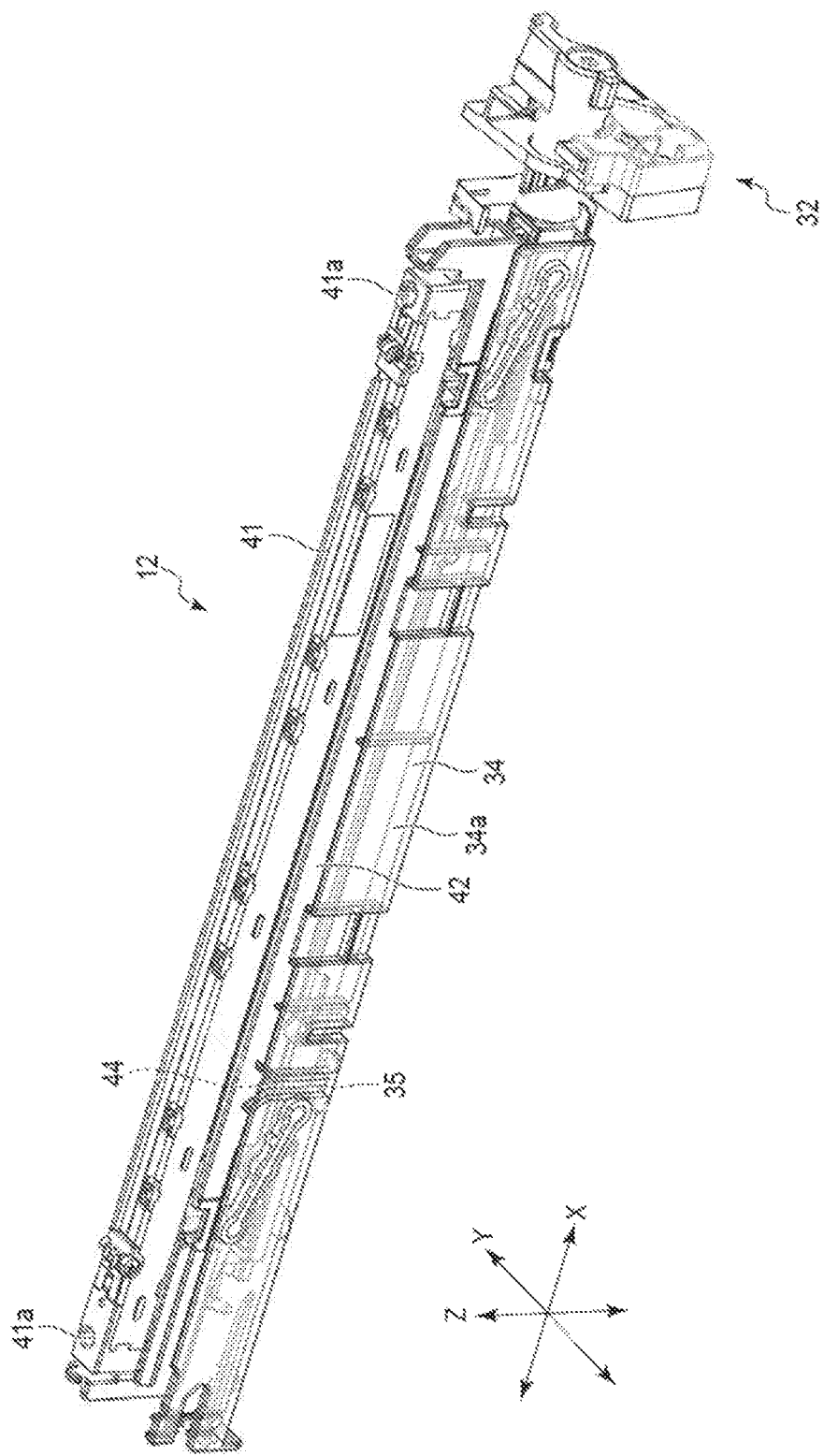
FIG. 14 is a perspective view of a solid state head unit.

Next, as shown in FIG. 14, the operator inserts a new, replacement image forming unit 13 from the insertion port 21a while the solid head 33 is still lowered towards the base 31 side. The image forming unit 13 first comes into contact with the first guide member 34 at the drum case 51, and moves along the first guide member 34 in the X direction. Then, the drum case 51 finally contacts the rear frame 22. Thus, the image forming unit 13 is supported by both the rear frame 22 and the solid head unit 12.

A pair of projection bodies 54 provided on the image forming unit 13 are provided to be substantially opposed to a pair of openings 41a formed in the print head 41 of the solid head 33.

As shown in FIG. 17 and FIG. 18, when the solid head 33 has been lowered to the base 31 side, a gap 5 in the X direction between the solid head unit 12 and the image forming unit 13 occurs due to the accumulation dimensional tolerances of each of the various components. When the relative displacement amount of the second guide Q (that is, the projection body 54 and the opening 41a, collectively) exceeds the guide range a2, the projection body 54 cannot be inserted into the opening 41a. Therefore, the guide range a1 in the X direction of the first guide P, that is, the regulating rib 35 and the dowel 44, is set to be less than the guide range a2.

Further, when the solid head 33 is being raised from the base 31 by operating the operation lever 32a, as shown in FIG. 19, the projection body 54 reaches the entrance of the opening 41a. At this point, as shown in FIG. 20, the dowel 44 is released from tight X-direction movement regulation provided by the regulating rib 35 at the lower position. The permitted movement of the dowel 44 in the X-direction is now the larger range provided by angled portions of the regulating rib 35 and the auxiliary guide 36. Therefore, the projection body 54 can be now be moved in the X direction with respect to the opening 41a without the limitations of the regulating range of the first guide P when the solid head 33 is at the lowered position.

Thus, as the solid head 33 is further raised with respect to the base 31 by operating the operation lever 32a, as shown in FIG. 21, the projection body 54 can be inserted into the opening 41a. On the other hand, as shown in FIG. 22, the dowel 44 has been released from tighter positional regulation range provided by the first guide P when at the lower position and thus each projection body 54 can be more reliably inserted into the openings 41a.

Figure 11:
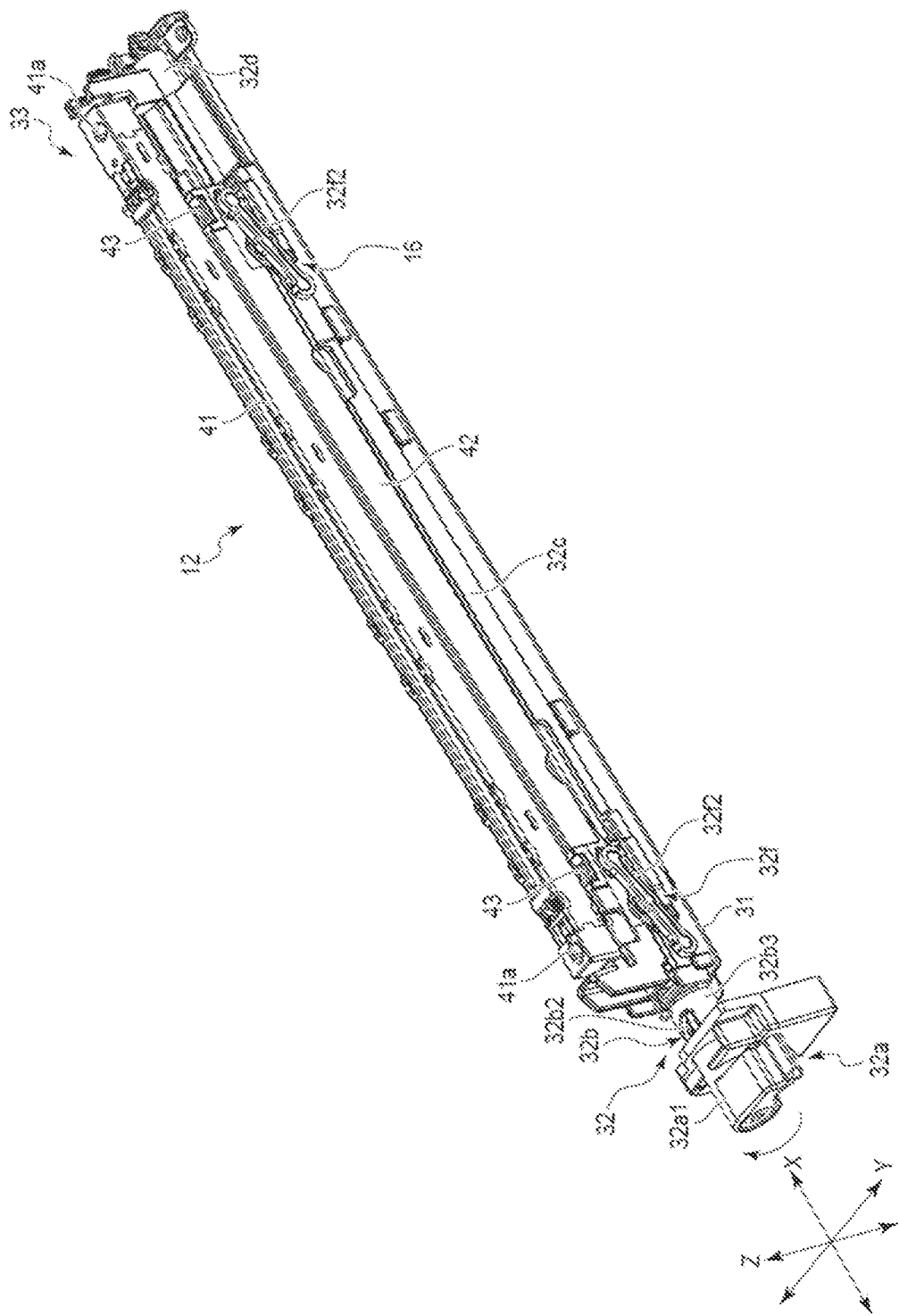
FIG. 11 is a perspective view of a solid state head unit.

Specifically, when the operator rotates the operation portion 32a1 in the direction of the arrow shown in FIG. 11, the shaft portion 32a2 rotates following the rotation of the operation portion 32a1. When the shaft portion 32a2 rotates, as shown in FIG. 14, the projection 32b1 provided in the shaft portion 32a2 moves along the groove 32b2 of the cylindrical body 32b3, and the shaft portion 32a2 moves from the front side to the rear side along the X direction in addition to the movement in the rotation direction.

When the shaft portion 32a2 moves in the X direction, the slider 32c fixed to the shaft portion 32a2 also moves along the X direction. When the slider 32c is moved from the front side to the rear side along the X direction, the support member 32e and the link body 32f2 are rotationally moved. Therefore, the solid head 33 is raised toward the photosensitive drum 52 within the second guide member 53. At this time, since the holder 42 moves between the pair of plate-like portions 53a of the second guide member 53 as shown in FIG. 6, the solid head 33 is guided to a predetermined position.

Then, the solid head 33 is raised to insert the projection body 54 into the opening 41a of the print head 41 and, for example, the print head 41 is brought into contact with the drum case 51 or the photosensitive drum 52. Accordingly, the image forming unit 13 is restricted from moving in the X direction, fixed to the frame 11 and the solid head unit 12, and the solid head 33 is aligned at a predetermined position suitable for the image forming process with respect to the photosensitive drum 52. The print head 41 is also constantly biased toward the photoreceptor drum 52 by the urging member 43 and thus held in place with respect to the photosensitive drum 52.

According to the image forming apparatus 1 configured as described above, even when a relative position displacement occurs in the X direction (gap 5) due to the accumulation of dimensional variations (e.g., manufacturing tolerances) of each component in the solid head unit 12 and the image forming unit 13, the guide range a1 in the X direction provided by the dowel 44 and the regulating rib 35 is set to be smaller than the guide range a2 in the X direction for the engagement of the projection body 54 and the opening 41a, thus the projection body 54 is able to be inserted in the opening 41a, and the relative positions of the solid head 33 and the photosensitive drum 52 can be guided to a predetermined position suitable for the image forming process. In other words, the first guide P makes it possible to align the projection body 54 on the image forming unit 13 with the opening 41a in the solid head 33. Therefore, the operation of mounting the image forming unit 13 on the image forming apparatus 1 may be performed simply by inserting the image forming unit 13 until the image forming unit 13 abuts against the rear frame 22, and then operating the operation lever 32a. Therefore, the image forming unit 13 can be more easily attached to the solid head unit 12.

For the purpose of improving the mounting process, a dimensional difference is left between the solid head unit 12 and the image forming unit 13. However, the first guide P guides the projection body 54 to the position relative to the opening 41a so that the solid head 33 and the photosensitive drum 52 can still be guided to a position suitable for the image forming process.

As described above, according to the image forming apparatus 1, the relative positional relationship between the solid head 33 and the image forming unit 13 can be reliably achieved.

The embodiments of the present disclosure are not limited to the specific examples described above. For example, in an example described above, the solid head 33 is moved up and down with respect to the photosensitive drum 52, and the link 32f is rotated by the movement of the slider 32c and slider 32c linearly moved by the rotation of the operation lever 32a, and the solid head 33 is moved up and down, but the possible arrangements are not limited to this.

In an above example, the image forming unit 13 is arranged above the solid head unit 12, but the present disclosure is not limited thereto, and the image forming unit 13 may be arranged below the solid head unit 12 in other embodiments.

In the image forming apparatus 1, it is possible to use only black toner, and thus only one solid head unit 12 and one image forming unit 13 need be provided in such an embodiment. Further, the image forming apparatus 1 may include other configurations and processing in addition to the above-described configuration and processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed:

1. An image forming apparatus, comprising:
a first frame including an insertion port configured for insertion of an image forming unit along a first direction;
a second frame spaced from the first frame in the first direction;
a solid head unit including a base attached to the first and second frames, a lifting mechanism, a solid-state print head, and a first guide member, the lifting mechanism being supported by the base and configured to move the solid-state print head up and down with respect to the base in response to movement of an operating lever accessible at the insertion port, the first guide member configured to position the solid head unit in a second direction perpendicular to the first direction and including a first guide rail on a surface facing the solid-state print head, the first guide rail limiting the movement of the solid-state print head in the first direction to a first range when the solid-state print head is lowered towards the base and a second range when the solid-state print head is raised from the base, the first range being less than the second range; and
an imaging unit including a photoconductive drum in a drum case, the imaging unit being insertable and removable via the insertion port, the drum case including a projection portion positioned to face the solid head unit when the imaging unit is inserted in the insertion port, the projection portion being configured to insert into a hole in the solid-state print head when the solid-state print head is raised from the base.

2. The image forming apparatus according to claim 1, wherein the first guide rail includes a first portion perpendicular to the first direction and a second portion oblique with respect to the first direction.

3. The image forming apparatus according to claim 1, wherein the hole in the solid-state print head includes an upper portion wider than a lower portion.

4. The image forming apparatus according to claim 1, further comprising:
a second guide rail on the inner surface of the first guide member, the second guide rail being spaced from the first guide rail in the first direction.

5. The image forming apparatus according to claim 4, wherein the first guide rail and the second guide rail are integral portions of the first guide member.

6. The image forming apparatus according to claim 1, wherein the first guide rail is an integral portion of the first guide member.

7. The image forming apparatus according to claim 1, wherein projection portion is an integral portion of the drum case.

8. The image forming apparatus according to claim 1, wherein solid-state print head is in contact with the photoconductive drum when the solid-state print head is fully raised.

9. The image forming apparatus according to claim 1, wherein the drum case includes a pair of projection portions each positioned to face the solid head unit when the imaging unit is inserted in the insertion port, each projection portion being configured to insert into a hole in the solid-state print head when the solid-state print head is raised from the base.

10. The image forming apparatus according to claim 1, wherein the solid-state print head is an LED print head.

11. The image forming apparatus according to claim 1, further comprising:
an urging member between the solid-state print head and the base, the urging member configured to press the solid-state print head towards the imaging unit.

12. The image forming apparatus according to claim 1, wherein the imaging unit stores toner.

13. An image forming apparatus, comprising:
a frame body with a port configured for insertion and removal of an image forming unit along a first direction;
a print head configured to expose a photoconductive drum of the image forming unit when the image forming unit has been inserted into the frame body;
a base attached to the frame body and supporting the print head;
a lifting mechanism including an operating lever accessible at the port, the lifting mechanism supported by the base and configured to move, in response to movement of the operating lever, the print head between a first position adjacent to the base and second position proximate to the photoconductive drum; and
a first guide member configured to position the print head in a second direction perpendicular to the first direction and including a first guide rail on a surface facing the print head, the first guide rail limiting the movement of the print head in the first direction to a first range when the print head is at the first position and a second range when the print head is at the second position, the first range being less than the second range, wherein
the print head includes a hole in a surface that faces the imaging unit when the imaging unit has been inserted, the hole being positioned to receive a projection portion formed on the imaging when the imaging unit has been inserted and the print head is at the second position.

14. The image forming apparatus according to claim 13, wherein the print head includes a pair of holes, each hole positioned to face the imaging unit when the imaging unit has been inserted, each hole being configured to receive a projection portion when the imaging unit has been inserted and the print head is at the second position.

15. The image forming apparatus according to claim 13, wherein the print head is an LED print head.

16. The image forming apparatus according to claim 13, further comprising:
   an urging member between print head and the base, the urging member configured to press the print head towards the imaging unit when the imaging unit has been inserted.

17. The image forming apparatus according to claim 13, wherein the imaging unit has been inserted in the port.

18. The image forming apparatus according to claim 17, wherein the imaging unit stores toner.

19. The image forming apparatus according to claim 13, further comprising:
   a second guide rail on the surface of the first guide member, the second guide rail being spaced from the first guide rail in the first direction.

20. The image forming apparatus according to claim 13, wherein the first guide rail is an integral portion of the first guide member.

* * * * *

UNITED STATES PATENT AND TRADEMARK OFFICE
CERTIFICATE OF CORRECTION

PATENT NO. : 11,009,827 B2
APPLICATION NO. : 16/895938
DATED : May 18, 2021
INVENTOR(S) : Takahiro Kojima It is certified that error appears in the above-identified patent and that said Letters Patent is hereby corrected as shown below:

In the Claims

In Column 11, Claim 2, Line 64, please replace "respect the" with "respect to the".

Signed and Sealed this
Seventh Day of June, 2022

Katherine Kelly Vidal
*Director of the United States Patent and Trademark Office*